United States Patent
Lu et al.

(10) Patent No.: US 12,391,495 B2
(45) Date of Patent: Aug. 19, 2025

(54) MAGNET ARRAYS FOR VEHICLE IDENTIFICATION IN AN INDEPENDENT CART SYSTEM

(71) Applicant: Rockwell Automation Technologies, Inc., Mayfield Heights, OH (US)

(72) Inventors: Haihui Lu, Shanghai (CN); Zhuo Liu, Shanghai (CN); Hao Yang, Shanghai (CN); Yuhong Huang, Acton, MA (US); Azeddine Choumach, Littleton, MA (US); Brian M. Perreault, Stow, MA (US); Daniel I. Lanier, North Billerica, MA (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 141 days.

(21) Appl. No.: 18/492,082

(22) Filed: Oct. 23, 2023

(65) Prior Publication Data

US 2025/0128897 A1    Apr. 24, 2025

(51) Int. Cl.
  *B65G 67/22*  (2006.01)
  *B65G 43/02*  (2006.01)
  (Continued)

(52) U.S. Cl.
  CPC ............ *B65G 67/22* (2013.01); *B65G 43/10* (2013.01); *B65G 54/02* (2013.01); *H02K 41/031* (2013.01);
  (Continued)

(58) Field of Classification Search
  CPC ........ B65G 54/02; B65G 43/10; B65G 43/02; B65G 2203/0283; B65G 2209/04; H02K 41/031
  (Continued)

(56) References Cited

U.S. PATENT DOCUMENTS 9,365,354 B2  6/2016  Takagi
9,600,851 B2  3/2017  Kleinikkink et al.
(Continued)

FOREIGN PATENT DOCUMENTS

CN   117782052 A  *  3/2024  .............. B60L 13/03
JP     7462855 B1  *  4/2024  .............. B65G 43/00

*Primary Examiner* — James R Bidwell
(74) *Attorney, Agent, or Firm* — Boyle Fredrickson, S.C.

(57) ABSTRACT

An independent cart system includes multiple track segments, multiple movers, multiple position sensors, and a controller. Each track segment includes multiple coils along a length of the track segment and a segment controller operative to selectively energize the coils to generate an electromagnetic field. Each mover includes a magnet array having multiple magnets, where the magnet array generates a magnetic field that interacts with the electromagnetic field generated by the coils to propel the mover along the track segments. The position sensors are spaced apart along the length of each track segment and generate a position feedback signal with a waveform as a function of the magnetic field generated by the magnet array on each mover. The controller is operative to receive the position feedback signal from each position sensor and to determine a unique identifier for each mover as a function of the waveform of the position feedback signal.

20 Claims, 15 Drawing Sheets

(51) Int. Cl.
*B65G 43/10* (2006.01)
*B65G 54/02* (2006.01)
*H02K 41/03* (2006.01)

(52) U.S. Cl.
CPC ........ *B65G 43/02* (2013.01); *B65G 2203/043* (2013.01)

(58) Field of Classification Search
USPC ........................................................ 198/805
See application file for complete search history.

(56) References Cited

U.S. PATENT DOCUMENTS

| | | |
|---|---|---|
| 9,611,107 B2 | 4/2017 | Wernersbach et al. |
| 10,161,970 B2 | 12/2018 | Sun et al. |
| 10,442,637 B2 | 10/2019 | Huang et al. |
| 10,906,748 B2 | 2/2021 | Ozimek et al. |
| 10,914,620 B2 | 2/2021 | Huang et al. |
| 11,307,067 B2 | 4/2022 | Huang et al. |
| 11,643,281 B2 | 5/2023 | Ozimek et al. |
| 2019/0006930 A1 | 1/2019 | Weber et al. |
| 2019/0047794 A1* | 2/2019 | Ozimek ............... G01D 5/2086 |
| 2020/0166389 A1* | 5/2020 | Huang ................. G01D 18/008 |
| 2021/0152055 A1* | 5/2021 | Mizuo .................. G01D 5/2451 |

* cited by examiner

MAGNET ARRAYS FOR VEHICLE IDENTIFICATION IN AN INDEPENDENT CART SYSTEM

BACKGROUND INFORMATION

The subject matter disclosed herein relates to permanent magnet arrays for vehicles in an independent cart system which are modified to aid in vehicle identification. More specifically, permanent magnet arrays mounted on each vehicle are constructed with variations in the materials, dimensions, alignment, or orientation of the magnets to generate magnetic fields that uniquely identify a vehicle.

Motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers. Each of the movers may be independently moved and positioned along the track in response to the electromagnetic fields generated by the coils.

The complexity of tracks and the number of movers present on a track in independent cart systems are increasing. The number of options for movers is also increasing. For example, movers may vary in size or function. One mover may travel independently while two other movers may travel in tandem. Different movers may have different fixtures configured to receive different payloads. The independent cart system must have knowledge of each mover, its location along the track, and its configuration to ensure that a properly configured vehicle is delivered to the correct location within the system at the proper time.

While the location of each vehicle may be tracked during operation, when power is cycled, the current location of a vehicle may be lost. While power is off, vehicles may be removed from the track for maintenance or new vehicles inserted into the system. It is, therefore, desirable to identify each vehicle and its present location when a system is powered up.

Historically, a separate identification tag has been provided on each vehicle. The identification tag may be, for example, an RFID tag, a magnet array, or some other identifier requiring a corresponding sensor to detect the identification tag. The identification sensor may be placed at one or more locations to scan vehicles as they travel by the location. However, the separate identification tags create an added expense for the dedicated tag on each mover and for the additional sensors to detect the identification tags.

Thus, it would be desirable to provide an improved system and method for identifying each mover in the independent cart system.

BRIEF DESCRIPTION

According to one embodiment of the invention, an independent cart system includes multiple track segments, multiple movers, multiple position sensors, and a controller. Each track segment includes multiple coils along a length of the track segment and a segment controller operative to selectively energize the coils to generate an electromagnetic field with the coil. Each mover includes a magnet array having multiple magnets, where the magnet array generates a magnetic field that interacts with the electromagnetic field generated by the coils to propel the mover along each of the track segments. The position sensors are spaced apart along the length of each track segment, and each position sensor generates a position feedback signal with a waveform which is a function of the magnetic field generated by the magnet array on each mover. The controller is operative to receive the position feedback signal from each position sensor and to determine a unique identifier for each of the movers as a function of the waveform of the position feedback signal.

According to another embodiment of the invention, an independent cart system includes a first mover and a second mover. The first mover includes a first magnet array, and the second mover includes a second magnet array. The first magnet array generates a first array magnetic field that interacts with an electromagnetic field generated by multiple coils to propel the first mover along a track for the independent cart system. The first magnet array includes multiple first magnets, where each first magnet includes a first length, a first width, and a first height. The first length extends orthogonal to a direction of travel for the first mover and parallel to a surface of the track. The first width extends in the direction of travel, and the first height extends orthogonal to the direction of travel and orthogonal to the surface of the track segment. Each first magnet includes a body of the first magnet and a first magnet magnetic field, where the first magnet magnetic field has a first orientation through the body of the first magnet. The second magnet array generates a second array magnetic field that interacts with the electromagnetic field generated by the coils to propel the second mover along the track for the independent cart system. The second magnet array includes multiple second magnets, where each second magnet corresponds to a first magnet in the first magnet array. Each second magnet includes a second length, a second width, and a second height. The second length extends orthogonal to a direction of travel for the second mover and parallel to the surface of the track. The second width extends in the direction of travel, and the second height extends orthogonal to the direction of travel and orthogonal to the surface of the track segment. Each second magnet includes a body of the second magnet and a second magnet magnetic field, where the second magnet magnetic field has a second orientation through the body of the second magnet. A physical construction of a first magnet differs from a physical construction of a corresponding second magnet such that the first array magnetic field differs from the second array magnetic field.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
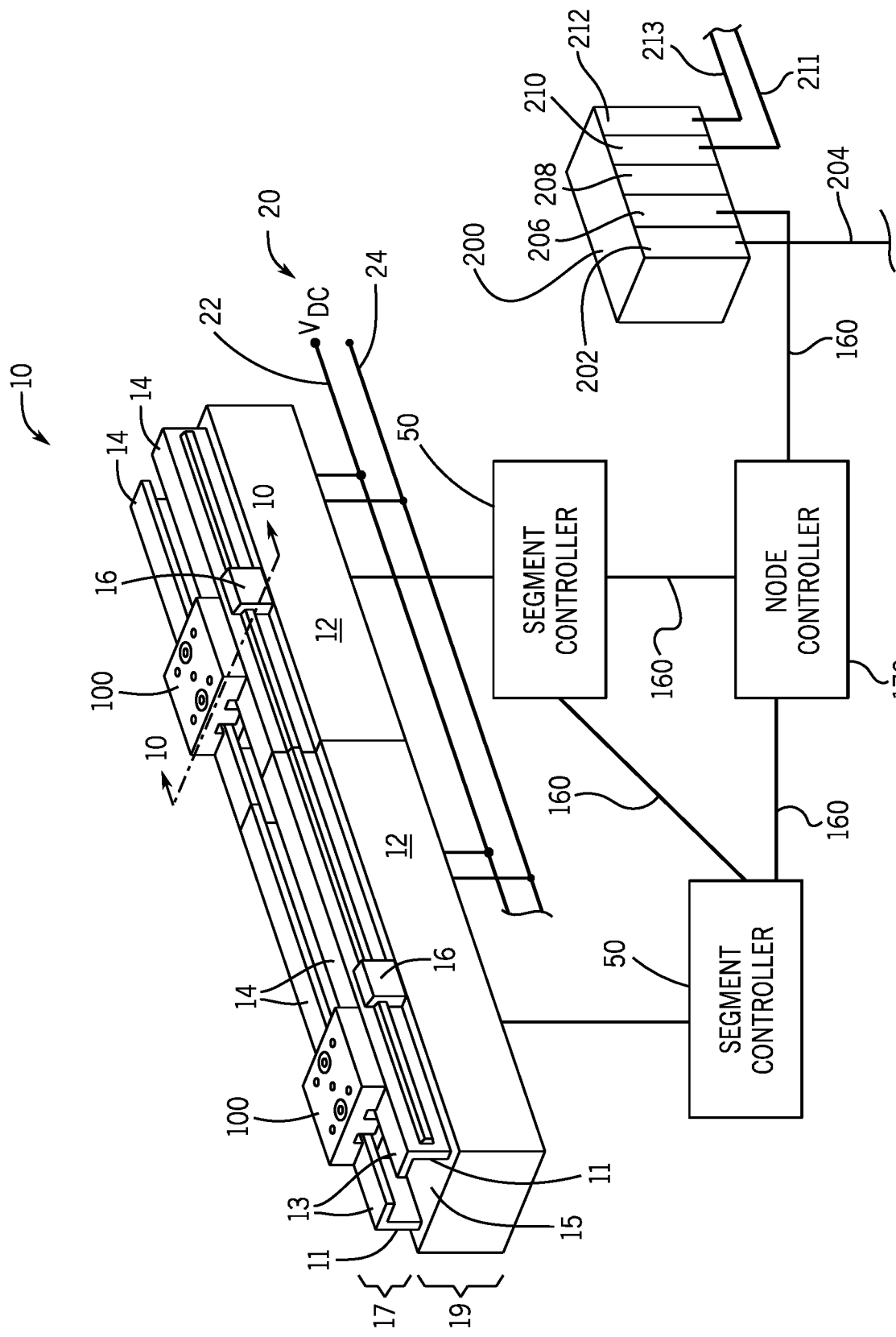
FIG. 1 is a schematic representation of an exemplary control system for an independent cart system according to one embodiment of the invention.
Figure 2:
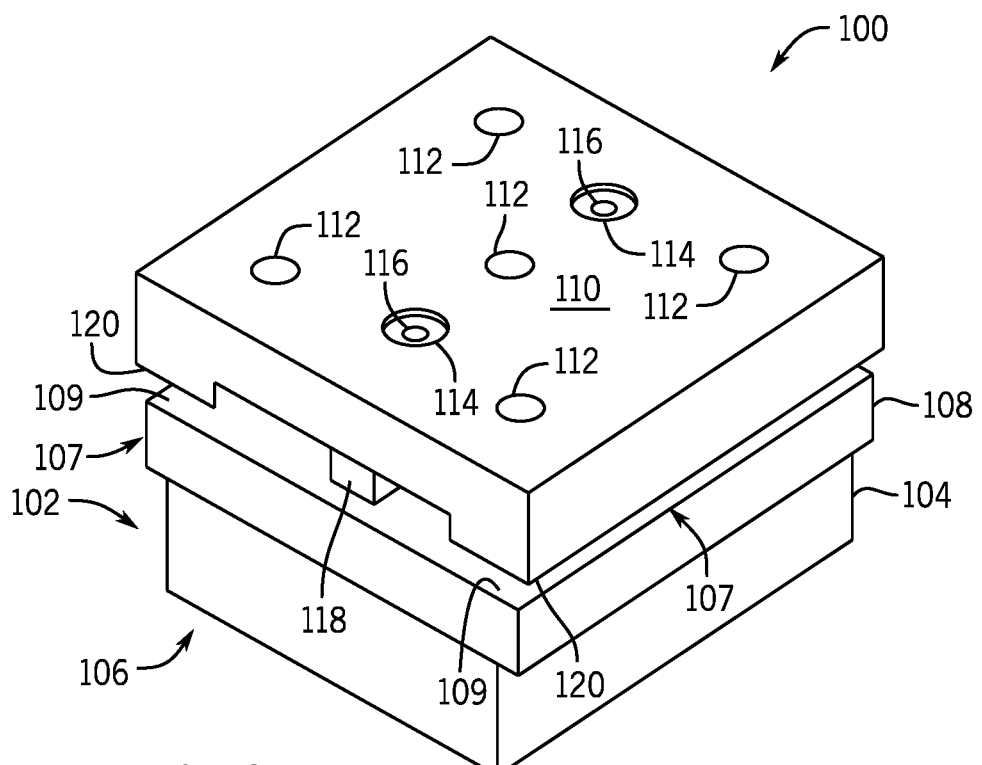
FIG. 2 is a perspective view of one embodiment of a mover configured to travel along the track of FIG. 1.
Figure 3:
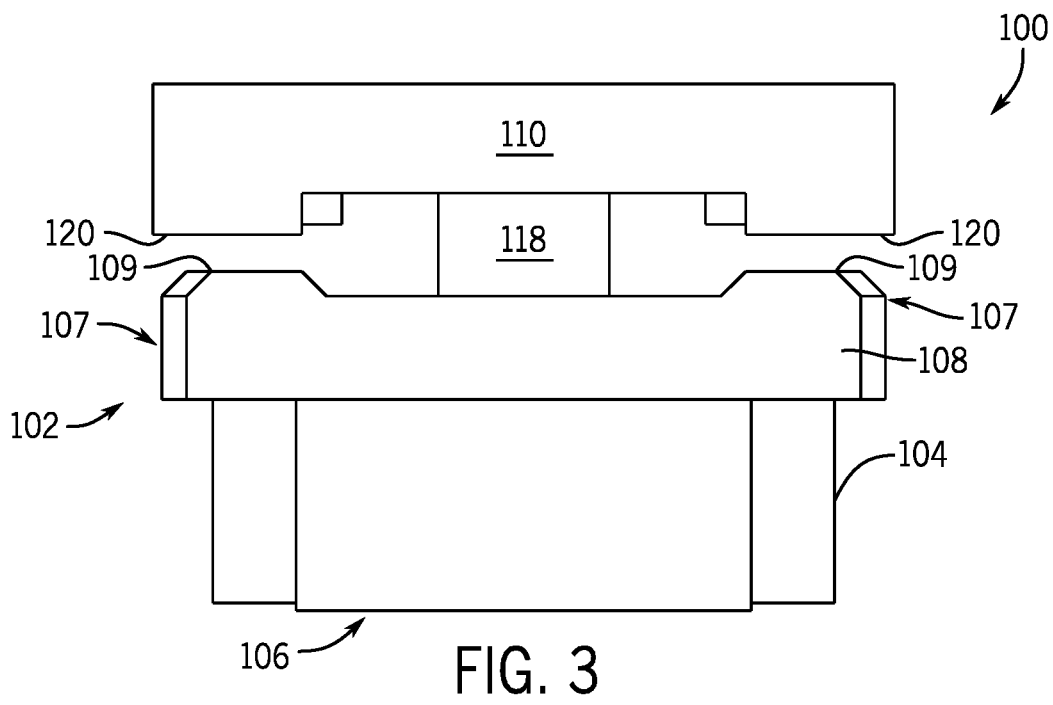
FIG. 3 is a front elevational view of the mover of FIG. 2.
Figure 4:
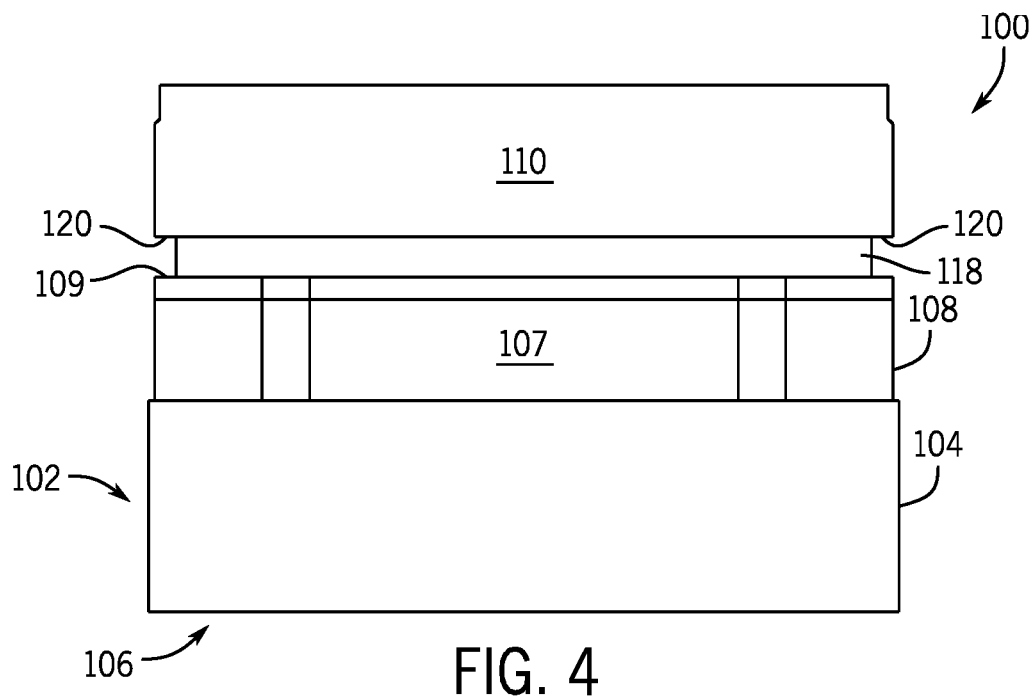
FIG. 4 is a side elevational view of the mover of FIG. 2.
Figure 5:
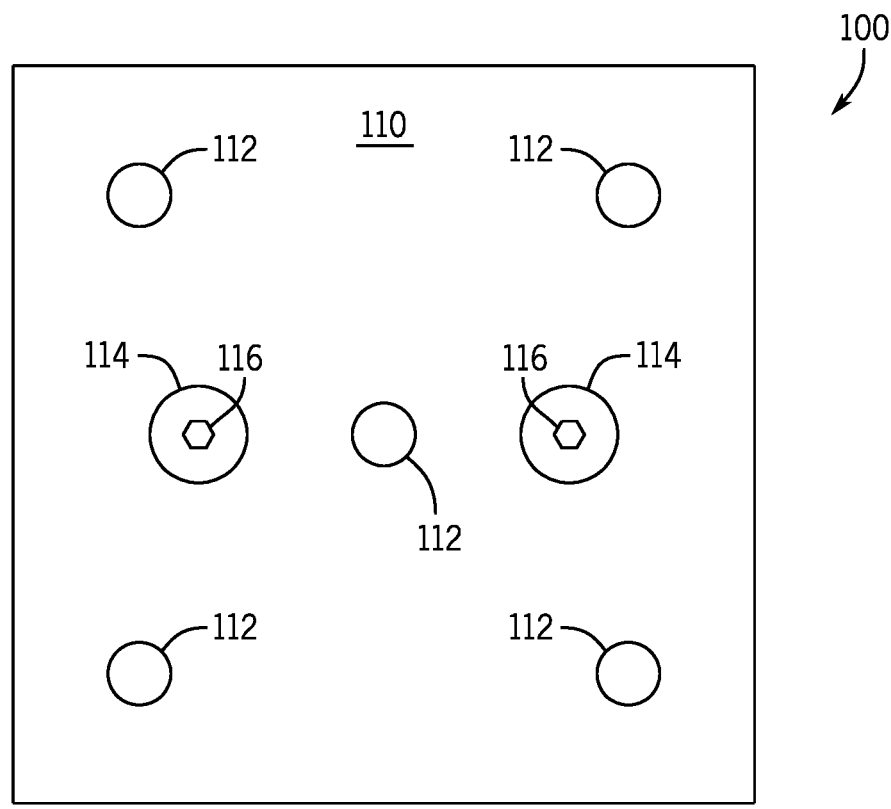
FIG. 5 is a top plan view of the mover of FIG. 2.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for identifying each mover in the independent cart system. The present invention utilizes the permanent magnet array, which is part of the linear drive system and already present on each mover, to provide identification for the vehicle. As part of the linear drive system, the permanent magnet array generates a magnetic field which interacts with an electromagnetic field generated by coils spaced along the track. The electromagnetic field is varied such that the electromagnetic field "travels" along the track which, in turn, attracts the magnetic field generated by the permanent magnet to follow the moving electromagnetic field. The interaction between the electromagnetic field and magnetic field drives the movers along the track.

Although each permanent magnet array may nominally be constructed in an identical manner, manufacturing tolerances in the positioning of magnets, in the dimensions of materials, in the orientation or strength of the magnetic field generated by the magnets and the like cause the magnetic field generated by each magnet array to vary slightly. A magnetic field sensor is used to detect these magnetic fields and may be used to characterize individual magnetic fields generated by each magnet array. In some applications, however, the magnetic fields for two movers which are nominally constructed in an identical manner may be too similar to distinguish different movers. As the complexity of independent cart systems increases and the number of movers present in each system similarly increases, the potential increases for two movers to have magnet arrays generating magnetic fields that are close enough to identical that each permanent magnet array may not be uniquely identified simply due to manufacturing tolerances.

The system for identifying each mover disclosed herein contemplates intentionally varying assembly of the permanent magnet arrays in different vehicles to generate unique magnetic fields for each vehicle. Numerous methods of varying construction of the magnet array are contemplated. For example, the length of a single magnet or the length of multiple magnets may vary. Further, multiple different lengths may be used for different magnets. Magnets of varying lengths may be aligned at the midpoint of each magnet or along one edge of the magnet. A magnet may be inserted into the array in which the magnet is polarized in a manner such that the orientation of the magnetic field varies. Either a single magnet or multiple magnets in an array may have an orientation other than orthogonal. Materials from which the magnets or from which structural components of the magnet array are constructed may vary. Each different arrangement of magnets will generate a unique magnetic field.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

Figure 6:
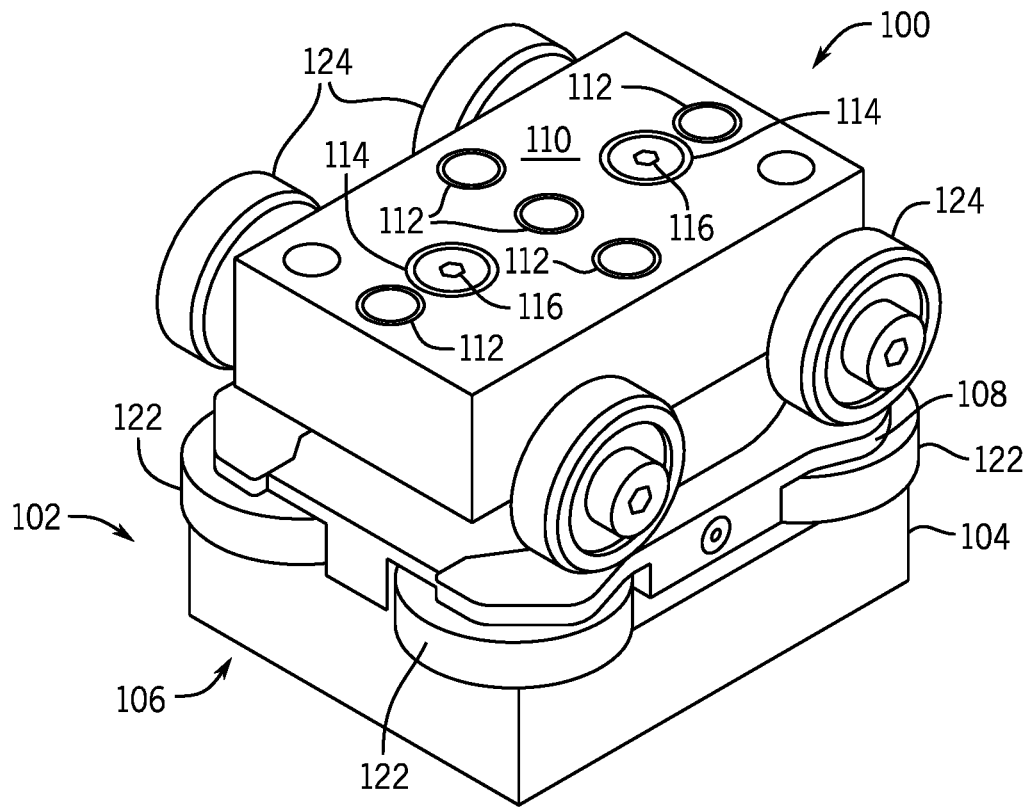
FIG. 6 is a perspective view of another embodiment of a mover configured to travel along the track of FIG. 1.
Figure 7:
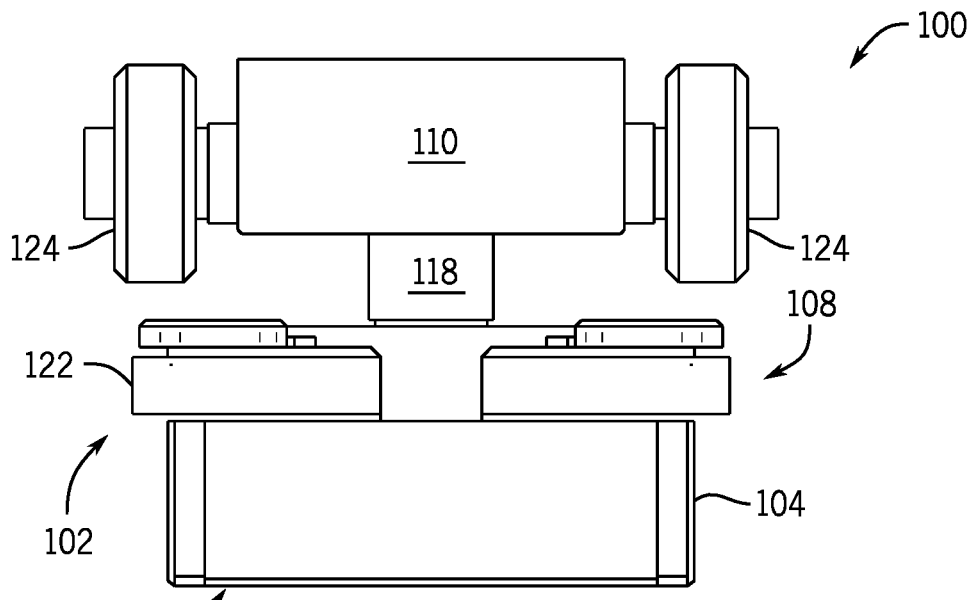
FIG. 7 is a front elevational view of the mover of FIG. 6.
Figure 8:
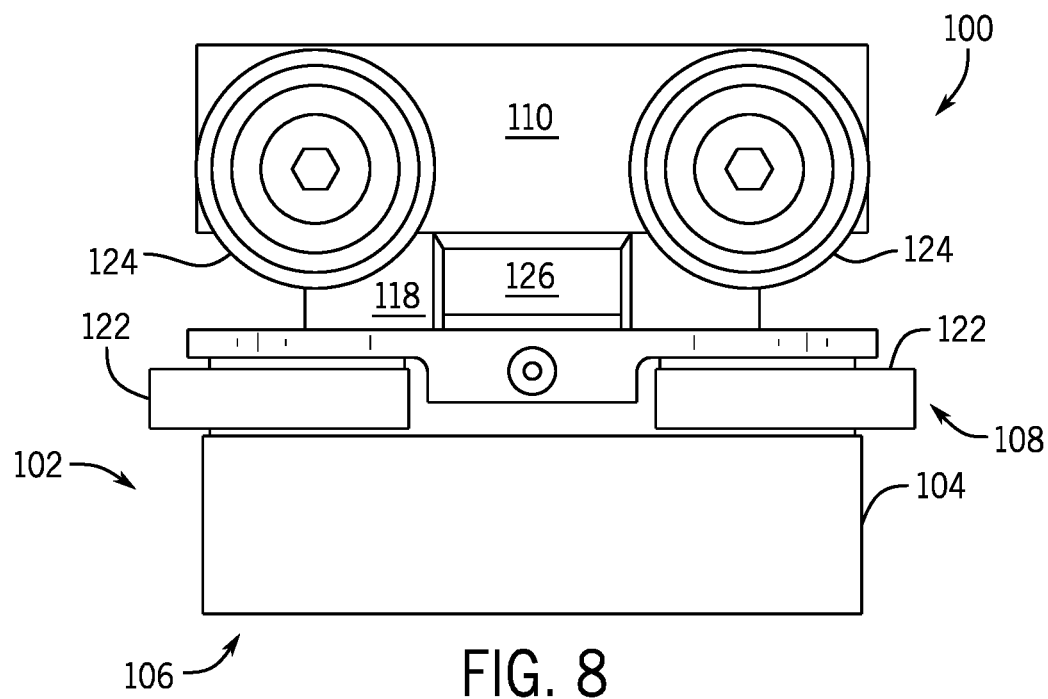
FIG. 8 is a side elevational view of the mover of FIG. 6.
Figure 9:
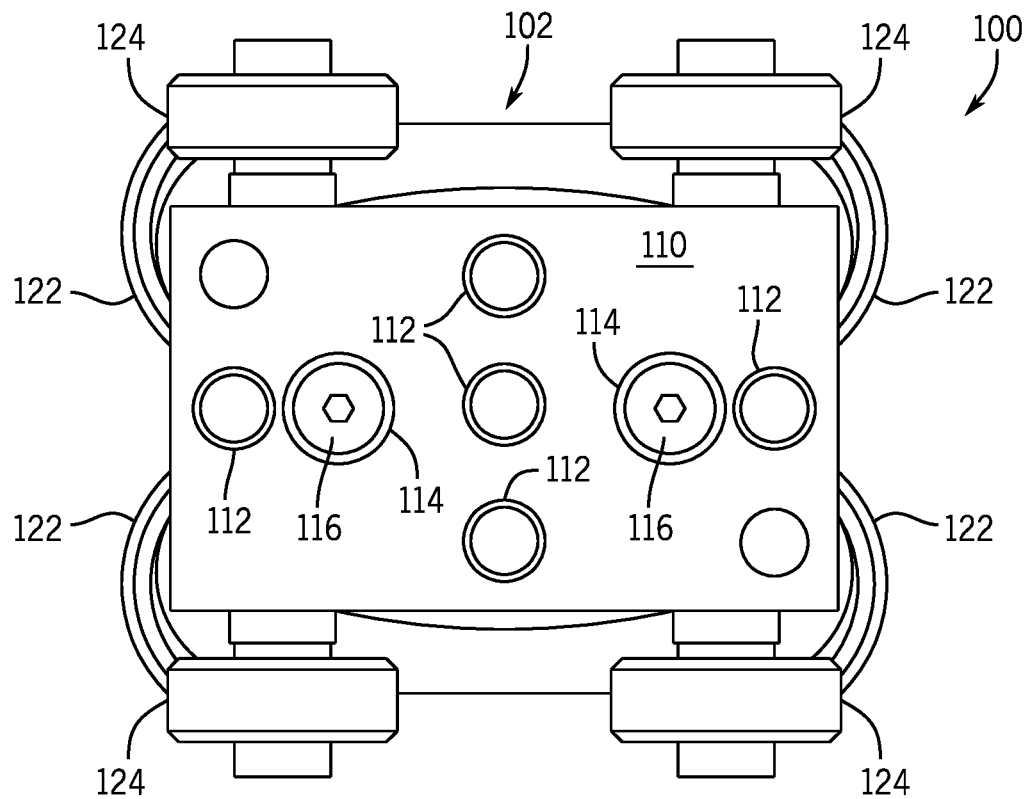
FIG. 9 is a top plan view of the mover of FIG. 6.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers 122, 124 (See e.g., FIG. 6) to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Turning next to FIGS. 2-5, one embodiment of the mover 100 is configured to slide along the channel 15 as it is propelled by a linear drive system. The mover 100 includes a body 102 configured to fit within the channel 15. The body 102 includes a lower portion 104, configured to hold magnets 130 (see also FIG. 10), and an upper portion 108, configured to engage the rails 14. The lower portion has a lower surface 106 to slide along the bottom surface of the channel 15. The upper portion 108 includes side contacting surfaces 107 which slide along an interior surface of the side segments 11 of the rails 14 and upper contacting surfaces 109 which slide along an interior surface of the top segments 13 of the rails 14. The mover 100 also includes a platform 110 mounted to the body 102 of the mover. An upper surface of the platform 110 includes multiple threaded openings 112 to which a fixture, or workpiece, may be mounted. Various workpieces, clips, fixtures, and the like may be mounted on the top of each platform 110 for engagement with a product to be carried along the track by the mover 100 according to an application's requirements. The platform 110 also includes a pair of openings 114 through which a threaded fastener 116 such as a bolt may be used to secure the platform 110 to the body 102 of the mover 100. A central guide portion 118 of the platform 110 extends downward toward the body 102 of the mover 100. The central guide portion 118 has a width less than the gap between the two rails 14 and fits within the gap between rails when the mover 100 is mounted on the track. The central guide portion 118 also extends further than lower contacting surfaces 120 on the platform 110 creating a gap between the upper contacting surfaces 109 of the body 102 and the lower contacting surfaces 120 of the platform 110 equal to the width of the top segment 13 of the rails 14 such that the lower contacting surfaces 120 of the platform 110 slide along an exterior surface of the top segments 13 of the rails. According to the illustrated embodiment, the platform 110 is generally square and has a sectional area similar to the sectional area of the body 102 as viewed from the top of the mover 100. It is contemplated that platforms 110, or attachments, of various shapes may be secured to the body 102.

Turning next to FIGS. 6-9, another embodiment of the mover 100 is configured to roll along the track as it is propelled by a linear drive system. The mover 100 includes a body 102 configured to fit within the channel 15. The body 102 includes a lower portion 104, configured to hold magnets 130 (see also FIG. 10), and an upper portion 108, configured to engage the rails 14. The lower portion has a lower surface 106 to slide along the bottom surface of the channel 15. The upper portion 108 includes side wheels 122 mounted in a horizontal configuration to roll along an interior surface of the side segments 11 of the rails 14. The mover 100 also includes a platform 110 mounted to the body 102 of the mover. An upper surface of the platform 110 includes multiple threaded openings 112 to which a fixture, or workpiece, may be mounted. Various workpieces, clips, fixtures, and the like may be mounted on the top of each platform 110 for engagement with a product to be carried along the track by the mover 100 according to an application's requirements. The platform 110 also includes a pair of openings 114 through which a threaded fastener 116 such as a bolt may be used to secure the platform 110 to the body 102 of the mover 100. The platform includes top wheels 124 mounted in a vertical orientation to roll along an exterior surface of the top segment 13 of each rail 14. A central guide portion 118 of the platform 110 extends downward toward the body 102 of the mover 100. The central guide portion 118 has a width less than the gap between the two rails 14 and fits within the gap between rails when the mover 100 is mounted on the track. The central guide portion 118 also extends further than top wheels 124 on the platform 110 creating a gap between the top wheels 124 and the side wheels 122 at least as large as the width of the top segment 13 of the rails 14 such that the top segment 13 of the rails fits between the top and side wheels. The central guide portion 118 further includes a center wheel 126 which may engage an edge of a rail 14 if the mover 100 moves too far to one side or the other of the channel 15. The center wheel 126 also assists in directing the mover 100 along switches between different track segments 12. According to the illustrated embodiment, the platform 110 is generally rectangular and has a length similar to a length of the body 102 as viewed from the top of the mover 100. It is contemplated that platforms 110, or attachments, of various shapes may be secured to the body 102.

Figure 10:
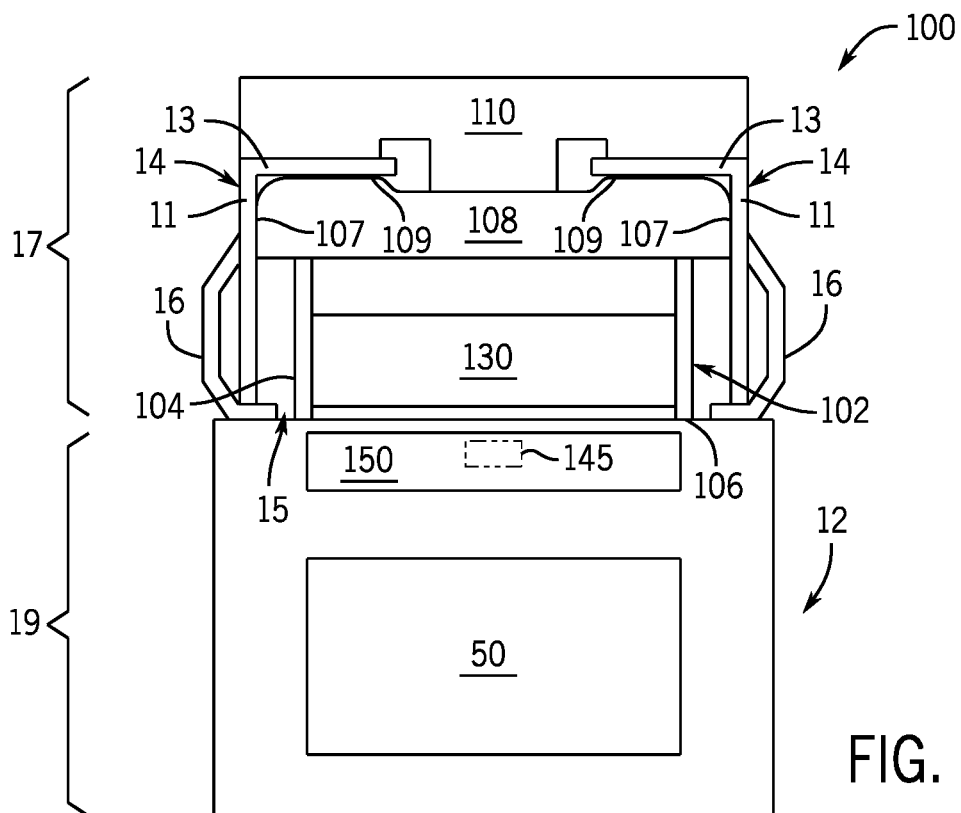
FIG. 10 is a sectional view of one embodiment of a mover and track segment included in the linear drive system taken at 10-10 of FIG. 1.
Figure 11:
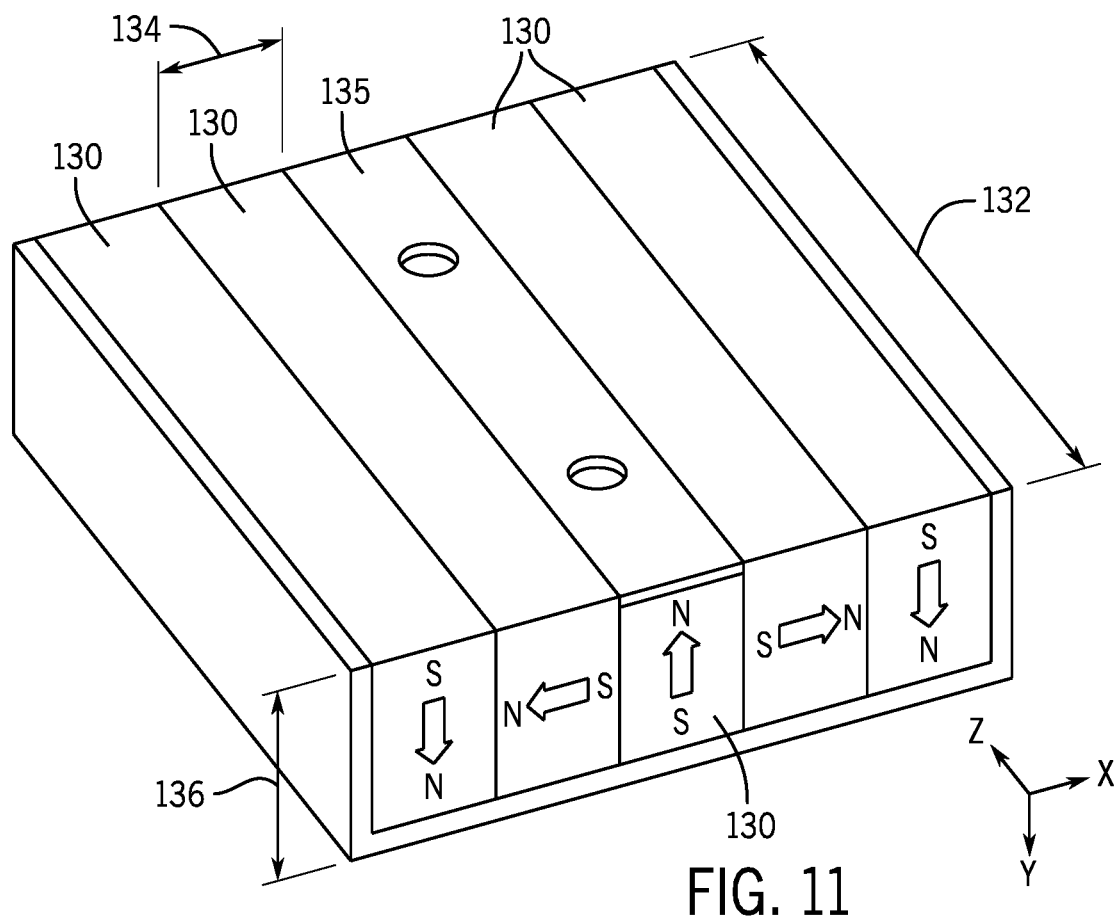
FIG. 11 is a perspective view of one embodiment of a magnet array used within the mover of FIG. 10.

The mover 100 is carried along the track 10 by a linear drive system. The linear drive system is incorporated in part on each mover 100 and in part within each track segment 12. One or more drive magnets 130 are mounted to each mover 100. With reference to FIG. 10, the drive magnets 130 are arranged in a block on the lower surface of each mover. With reference also to FIG. 11, the illustrated embodiment includes five drive magnets 130 placed adjacent to each other in a Halbach array to define the block of magnets. Each magnet 130 has a length 132 extending in the z-axis, a width 134 extending in the x-axis, and a height 136 extending in the y-axis. As will be discussed in more detail below, each magnet 130 in the array may have identical lengths 132, widths 134, and heights 136 or, alternately, one or more of the magnets 130 may have a length 132, width 134, or height 136 that is different than the other magnets. From left-to-right in FIG. 11, a first drive magnet 130 has a north pole oriented along a y-axis toward the track when the mover 100 is mounted on the track. A second drive magnet 130 has a north pole oriented along an x-axis, and a third drive magnet 130 has a north pole oriented along the y-axis away from the track. A fourth drive magnet 130 has a north pole oriented along the x-axis in a direction opposite the second magnet, and a fifth drive magnet 130 has the north pole again oriented toward the track along the y-axis. As also illustrated, an orientation of the magnetic field is illustrated by the arrow pointing from the south pole toward the north pole. For movers 100 having a greater length, this rotation of the orientation for the drive magnets 130 may continue along the length of the mover 100. The Halbach array configuration has an advantage of cancelling magnetic flux tending to extend upward into the rest of the mover 100 while increasing the magnetic flux tending to extend downward toward the track for interaction with the linear drive system. The illustrated embodiment for the arrangement of drive magnets 130 is not intended to be limiting. Various other configurations of the drive magnets 130 may be utilized as non-illustrated embodiments of the invention.

Figure 12:
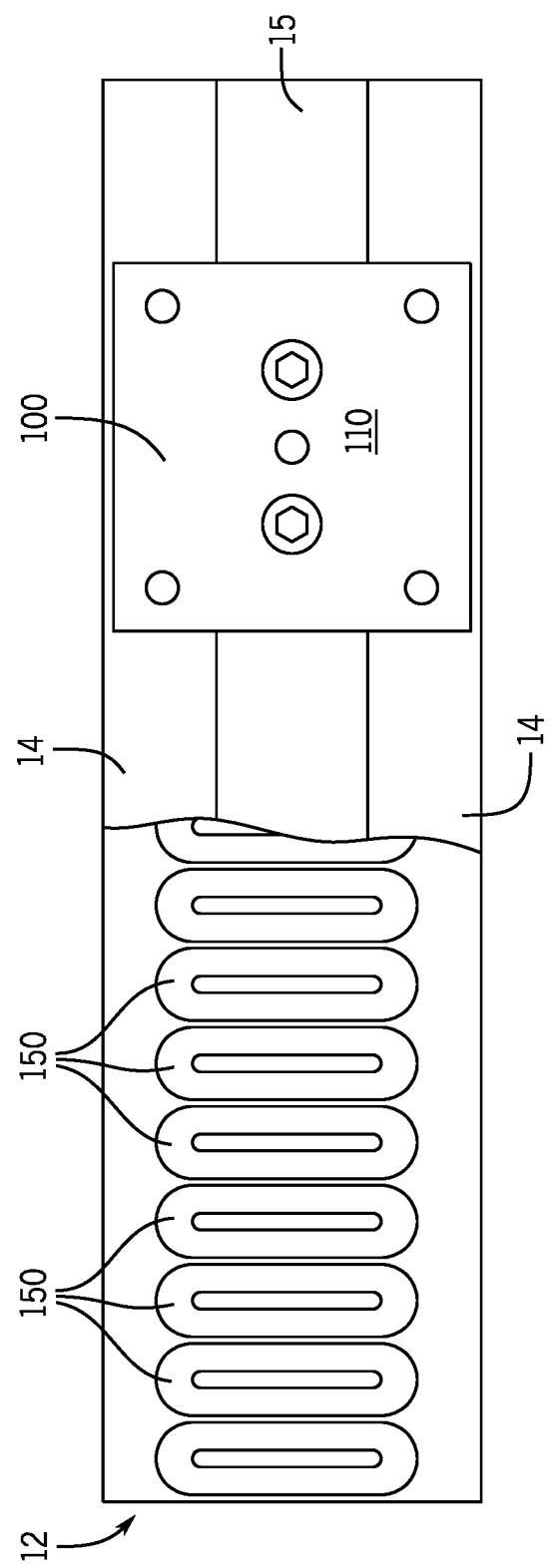
FIG. 12 is a partial top cutaway view of the mover and track segment of FIG. 1.

The linear drive system further includes a series of coils 150 spaced along the length of the track segment 12. With reference also to FIG. 12, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 10, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

Figure 13:
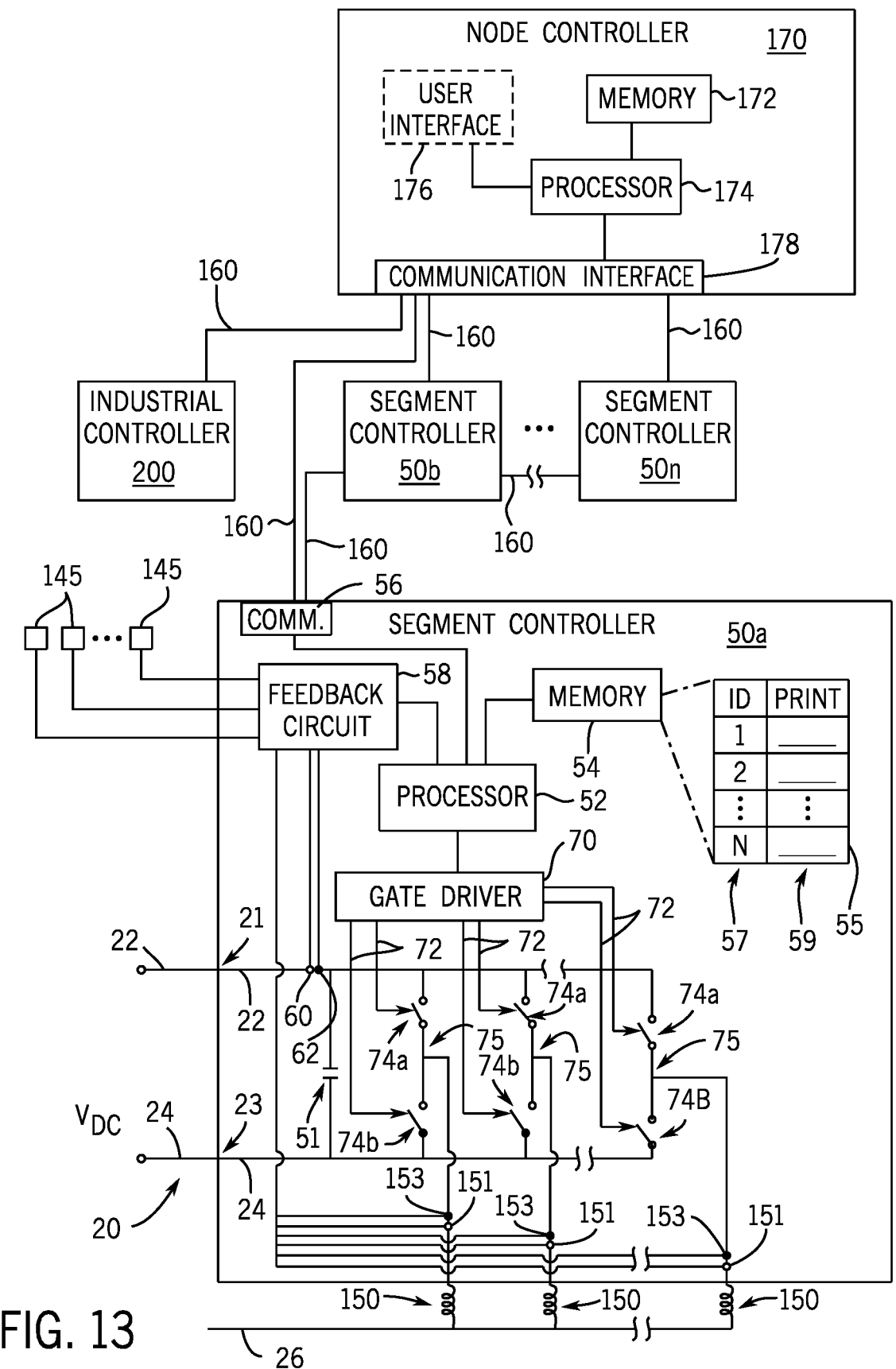
FIG. 13 is a block diagram representation of the exemplary control system of FIG. 1.

With reference also to FIG. 13, the node controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the node controller 170 and to load or configure desired motion profiles for the movers 100 on the node controller 170. Optionally, the configuration may be performed via a remote device connected via a network and a communication interface 178 to the node controller 170. It is contemplated that the node controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the node controller 170 and user interface may be an industrial computer mounted within a control cabinet and configured to withstand harsh operating environments. It is contemplated that still other combinations of computing devices and peripherals as would be understood in the art may be utilized or incorporated into the node controller 170 and user interface 176 without deviating from the scope of the invention.

The node controller 170 includes one or more programs stored in the memory device 172 for execution by the processor 174. The node controller 170 receives a desired position from the industrial controller 200 and determines one or more motion profiles for the movers 100 to follow along the track 10. A program executing on the processor 174 is in communication with each segment controller 50 on each track segment via a network medium 160. The node controller 170 may transfer a desired motion profile to each segment controller 50. Optionally, the node controller 170 may be configured to transfer the information from the industrial controller 200 identifying one or more desired movers 100 to be positioned at or moved along the track segment 12, and the segment controller 50 may determine the appropriate motion profile for each mover 100. Various features of the present application will be discussed herein as being executed within the segment controller 50, the industrial controller 200, and the node controller 170. As illustrated in FIGS. 1 and 13, these controllers are interconnected by the network media 160. According to other, non-illustrated embodiments of the invention, various features discussed herein as implemented on one of the controllers 50, 200, 170 may be implemented on another controller with communication via the network media 160 transmitting data required to perform the functions between the various controllers.

Figure 14:
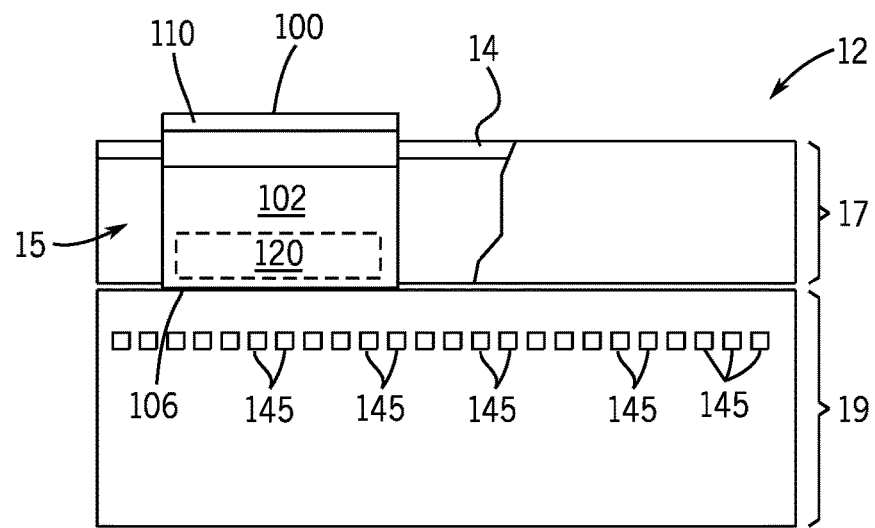
FIG. 14 is a partial side cutaway view of the mover and track segment of FIG. 1.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, illustrated in FIGS. 10 and 14, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal 225 (See FIG. 15) provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal 225 which is offset from each other by ninety electrical degrees (90°). Multiple position sensors 145 are, therefore, generating feedback signals 225 in tandem for a single mover 100 as the mover is travelling along the track 10. The feedback signals 225 from each position sensor 145 are provided to a feedback circuit 58 which, in turn, provides a signal to the processor 52 corresponding to the magnet 130 passing the sensor 145.

The segment controller 50 also includes a communication interface 56 that receives communications from the node controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74*a* and a second switching device 74*b* connected in series between the positive rail 22 and the negative rail 24 with a common connection 75 between the first and second switching devices 74*a*, 74*b*. The first switching device 74*a* in each leg may also be referred to herein as an upper switch, and the second switching device 74*b* in each leg may also be referred to herein as a lower switch. The terms upper and lower are relational only with respect to the schematic representation and are not intended to denote any particular physical relationship between the first and second switching devices 74*a*, 74*b*. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 130 on each mover 100 to control motion of the movers 100 along the track segment 12.

In operation, the position sensors 145 spaced along the track 10 are used to identify each mover 100 in the independent cart system. Upon power-up, the segment controller 50 in each track segment 12 monitors the position feedback signal generated by a mover 100 present on the track segment to identify which mover is present. In some applications, either the industrial controller 200, the node controller 170, each segment controller 50, or a combination thereof may maintain a record of the mover locations prior to cycling power. Initial operation of the independent cart system may begin using the prior mover identities and locations, and a verification process may use the first feedback signal generated by a position sensor 145 to confirm that each mover 100 corresponds to the data stored prior to power being cycled and that no mover has been removed, inserted, or relocated while power was removed. Optionally, a temporary identifier may be assigned to each mover 100. Either the identifier stored prior to cycling power or the temporary identifier may be used for each mover 100 such that an initial motion command may be transmitted to each segment controller 50 to cause a small motion of each mover 100. The small motion may be, for example, a forward and/or reverse motion for a distance to generate one cycle of a waveform 225 (see FIG. 15) from a position sensor 145 proximate each mover 100. The one cycle of the waveform 225 is then used to identify each mover 100 present on a track segment 12. After identifying each mover 100, the temporary identifier is replaced and full operation of the independent cart system may resume.

According to one aspect of the invention, multiple movers 100 may be arranged as a virtual link. The movers 100 are not physically connected to each other, but rather maintain a record of at least one other mover adjacent to the corresponding mover. A mover 100 with one adjacent link may maintain a record of either the upstream or the downstream mover. A mover 100 with two adjacent links may maintain a record of both the upstream and downstream movers adjacent to the corresponding mover. During operation, a segment controller 50 responsible for a mover 100 included within a virtual link obtains a record of the identifier not just for the corresponding mover, but also for the mover(s) present in the virtual link. During an initial commissioning process, the segment controller 50 first obtains the identify for each mover, as discussed in more detail below, but also then receives the identity of the mover(s) present in the virtual link. A table is established which creates a correlation between each mover 100 and the other movers present in the virtual link. The segment controller 50 responsible for each of the movers 100 in the virtual link is able to compare the identities associated with each mover 100 to the identities associated with each of the other movers 100 present in the virtual link. If a difference exists, then the segment controller is aware of a misidentification of one of the movers 100. The error may occur during operation if, for example, the identities of each mover 100 are periodically checked. When a mover 100 receives a new identity of an adjacent mover, it may compare the new identity to the prior identity to verify that each mover has been properly identified.

When power is cycled and no change is made to the number or location of movers during a power cycle, the identities of each mover 100 may be verified by the comparing the identities associated with one mover 100 to the identities associated with the other movers within the virtual link. Such a shut down may commonly occur overnight, for example, for independent cart systems operated during a single shift. The next morning, when a system is powered up, the segment controller 50 responsible for each mover 100 first determines its corresponding identity. When passing the corresponding identity for one mover 100 to the other movers 100 within a virtual link, the segment controller 50 responsible for the other movers may compare the new identity to the previously stored identity of the other movers in the virtual link. If one of the identities in the virtual link does not match, an error in determining the identities of the movers 100 is detected.

Figure 15:
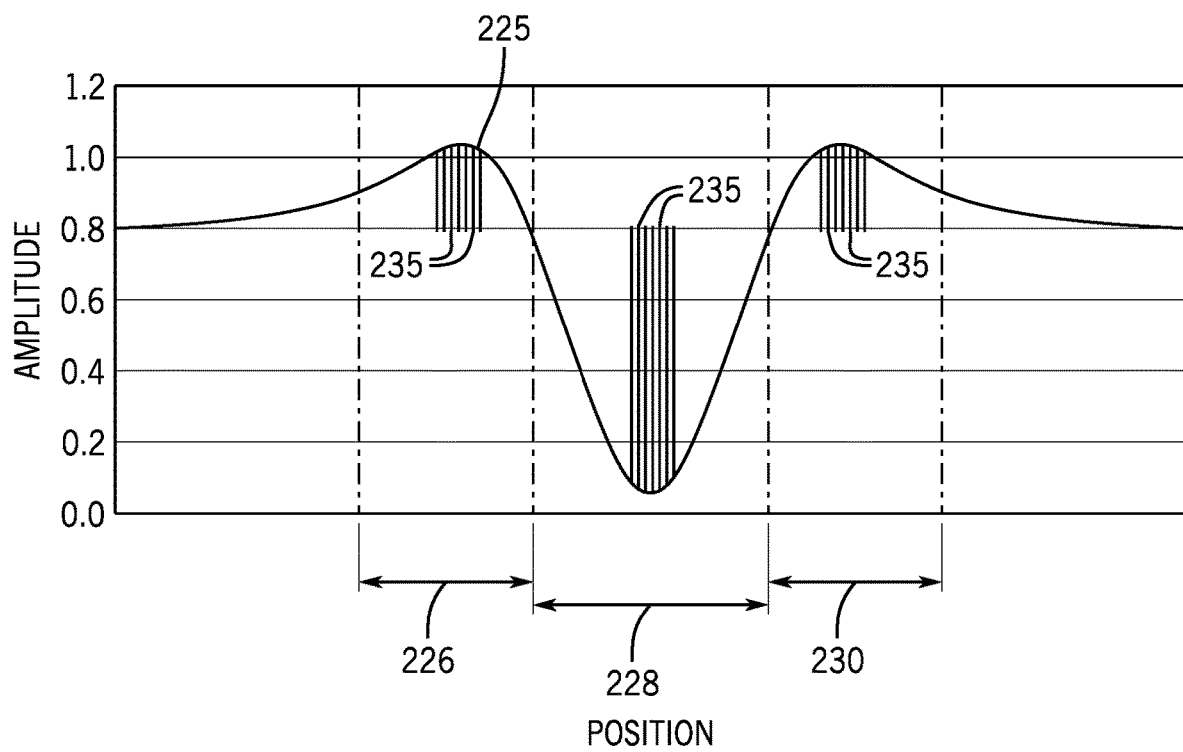
FIG. 15 is a graphical representation of an exemplary position feedback waveform with respect to position.

As a mover 100 travels past a position sensor 145, the position sensor 145 generates a waveform 225 corresponding to the magnetic field generated by the magnets 130 present on the mover 100. With reference to FIG. 15, an exemplary waveform 225 is illustrated, which corresponds to the magnetic field generated by the magnet array illustrated in FIG. 11. Under ideal conditions, each waveform 225 would be identical for each mover 100 travelling past each position sensor 145. However, variations in manufacturing, device tolerances, offset values in sensors, and other such device tolerances results in waveforms 225 that vary between movers 100. Device tolerances exist in both the position sensors 145 and in the magnets 130 mounted on the movers 100. The present invention utilizes variations in the magnets 130 and in the magnetic fields generated by the magnets 130 to uniquely identify each mover 100.

Figure 21:
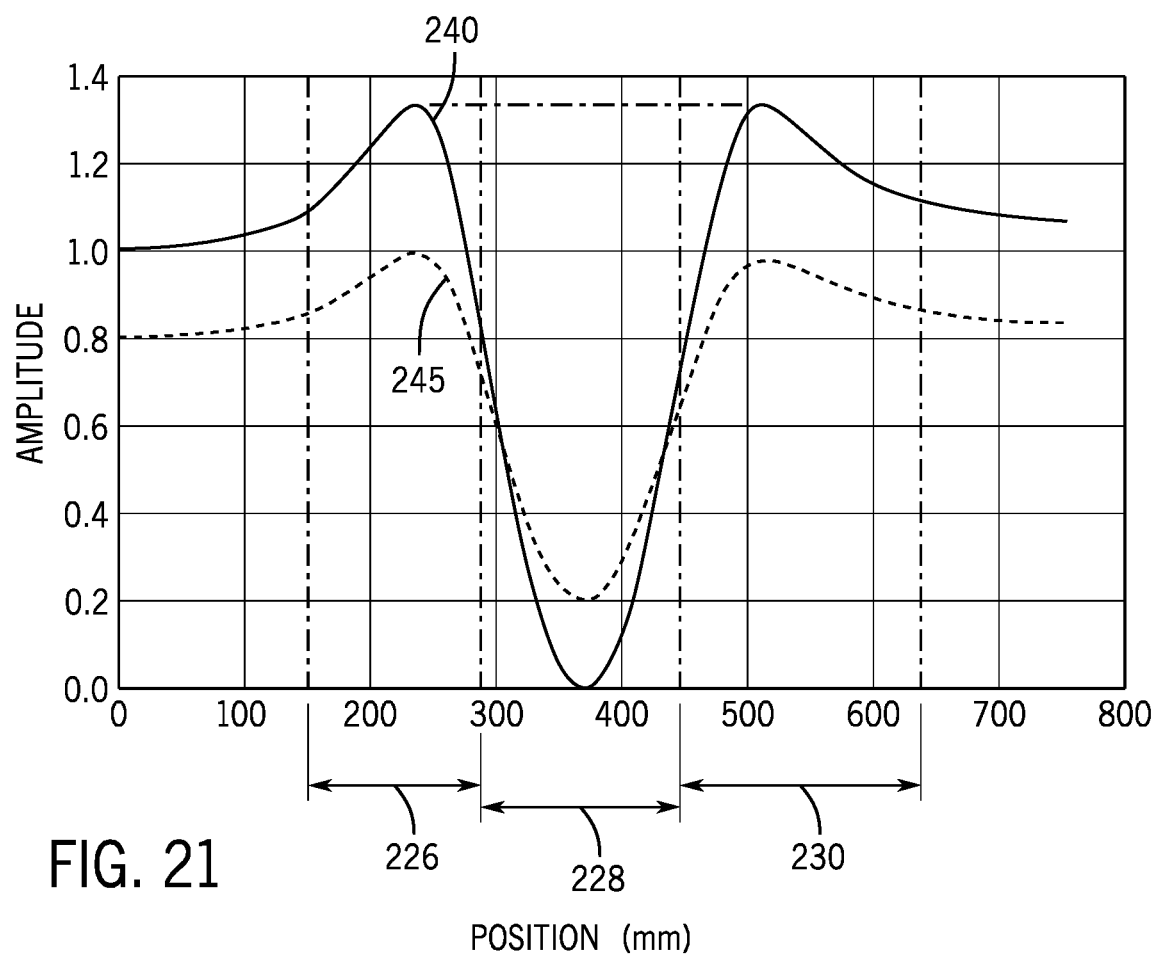
FIG. 21 is a graphical representation of an exemplary position feedback waveform taken from a first position feedback sensor compared to a second position feedback waveform taken from a second position feedback sensor, where the second position feedback sensor has both an offset and a gain different than the first position feedback sensor.

With reference to FIG. 21, variations between a waveform 245 generated by a position sensor 145 and a nominal waveform 240 for the position feedback signals is illustrated. The nominal waveform 240 for each position feedback signal corresponds to an ideal feedback signal generated by one of the position sensors 145 if the array of magnets 130 and each position sensor 145 are manufactured and installed according to their respective nominal configuration and without variations in manufacturing tolerances. Numerous data points along the nominal waveform 240 may be stored in memory 54 of each segment controller 50 for use in compensating feedback signals from individual position sensors 145. The second waveform 245 is a non-ideal position feedback signal for comparison to the nominal position feedback signal 240. As the second waveform 245 is compared to the first waveform 240, there are clear differences between the signals. For example, at the zero position along the horizontal axis, corresponding to time at which the position feedback signal is being generated with no magnet 130 proximate to the position sensor 145, the nominal waveform 240 is equal to zero. However, the non-ideal waveform 245 is equal to a negative two-tenths, indicating an offset error in the position sensor 145 generating the second waveform 245. Further, the peak-to-peak range for the nominal waveform 240 is approximately one and three-tenths. However, the peak-to-peak range for the second waveform 245 is approximately eight-tenths, indicating a gain error in the position sensor 145 generating the second waveform. FIG. 21 illustrates differences between a waveform 245 generated by a single position sensor 145 and a nominal waveform 240 for the position feedback signal. Each position sensor 145 may have different variations in the waveform generated by the variations between different position sensors 145 as a result of manufacturing tolerances in the sensors, in locations at which the position sensor is mounted on the track segment 12, in the quality of the material covering the position sensor and located between the sensor and the magnet, or a combination thereof.

When power is cycled, however, the exact location of each mover 100 may vary along the track according to the process being performed by the independent cart system prior to power being removed. When power is restored, each position sensor 145 must be able to identify a mover 100 as a function of the magnetic field generated by the array of magnets 130 present on the mover. Variations in the waveforms generated by different position sensors would result in different identification of movers 100 as a function of which position sensor 145 is being used to perform the identification.

In order to eliminate variations between position sensors 145 from generating differences in waveforms 225, an initial calibration routine is performed by each segment controller 50 for each of the position sensors 145 located along the corresponding track segment 12. According to one aspect of the invention, a compensation table may be stored in the memory 54 of the segment controller 50. Initially, the values of the waveform 240 for the nominal position feedback signal may be utilized to generate the compensation table for each of the position sensors 145 on the track segment 12. Values for the position feedback signal 245 from each position sensor 145 are compared to values for the nominal feedback signal 250 which determines variations in the gain and/or offset present on a particular feedback sensor 145. During the initial calibration routine a mover 100 having an array of magnets 130 generating a known magnetic field may be driven past each of the position feedback sensors 145 on the track segment 12. Each value for the waveform 245 generated as the known array of magnets 130 passes one of the position feedback sensors 145 is compared to the values for the waveform 240 of the nominal position feedback signal. A difference between the values at the zero location, when the magnets 130 on the mover 100 are not close enough to the sensor 145 to generate a position feedback signal, may be stored in the compensation table for each sensor 145 to provide an initial offset compensation for each position feedback sensor 145. The peak-to-peak values generated by the second waveform 245 may be stored in the compensation table for each sensor 145 or, optionally, the processor 52 may use the peak-to-peak value to determine an initial sensor gain for each position sensor 145 and the initial sensor gain may be stored in the compensation table to provide gain compensation. The offset and gain calculations are used to normalize the waveforms 245 generated by each position feedback sensor 245 to a nominal waveform 240.

Referring still to FIG. 21, the nominal waveform 240 is divided into three segments 226, 228, 230. Each segment 226, 228, 230 corresponds to a peak of the nominal waveform 240. A corresponding peak of the second waveform 245 exists for each peak of the nominal waveform 240. However, as further illustrated in FIG. 21, the first peak and the third peak of the nominal waveform 240 reach the same value. The first peak and the third peak of the second waveform 245 do not reach the same value. As a result, a single gain and offset value applied to the second waveform 245 will not end up having both the first and third peaks of the second waveform 245 correspond to the nominal waveform 240. Rather, a single gain and offset value for the second waveform 245 may be selected to have either the first or third peak correspond to the first or third peak of the nominal waveform while having some variation between the other peak. Similarly, each position feedback sensor 145 may have one point of the waveform 245 generated by the sensor 145 adapted to match the corresponding point in the nominal waveform 240. However, other values along the second waveform 245 may vary from the nominal waveform 240. Further, the variations in manufacturing observed by each position feedback sensor 145 may make different points on the second waveform 245 correspond to the nominal waveform for each sensor.

To further eliminate variations in the second waveform 245 as a result of the variations in manufacturing tolerances for the position sensors 145, the second waveform 245 may first be divided into segments, and each segment of the waveform is normalized. According to one aspect of the invention, the waveform is divided into segments which correspond to each peak value of the waveform. Turning to FIG. 15, the illustrated waveform 225 includes three peak values, with a first peak value and a third peak value at a positive value and a second peak value at a negative value. A first segment 226 corresponds to the first peak value, a second segment 228 corresponds to the second peak value, and a third segment 230 corresponds to the third peak value. Each segment of the waveform is normalized in a similar manner to that discussed above. A first offset value and a first gain value are determined for the first segment 226, a second offset value and a second gain value are determined for the second segment 228, and a third offset value and a third gain value are determined for the third segment 230. The compensation table for each position sensor 145 includes three offset values and three gain values which are applied to the measured position feedback signal as a mover travels past the position sensor, normalizing each of the three segments 226, 228, 230 independently according to their respective offset and gain values. As a result of normalizing the waveform 225 by segments, each peak value for the measured waveform more closely corresponds to the nominal waveform which reduces variation in the measured waveform as a result of variations in the position sensors 145.

According to another aspect of the invention, the waveform 225 generated by each position feedback sensor 145 may be normalized by position. Each position sensor 145 generates a continuous analog feedback signal which is provided to the feedback circuit 58 in the segment controller. This analog feedback signal is converted to a digital value for use in the processor 52 to perform the features described herein. Under traditional program execution, the analog feedback signal is converted to digital values at discrete time intervals. The sampling may occur in the feedback circuit 58 or in the processor 52. Commonly, an interrupt routine, clock-driven routine, or other periodic signal causes the segment controller to obtain a value for the feedback signal. Values sampled at periodic intervals are referred to as time-based samples.

As a mover 100 travels along the track 10, certain track segments 12 may cause the mover 100 to travel over that track segment 12 differently on successive passes. For example, debris in the channel 15 may cause extra friction during one pass over a track segment 12, where the debris is cleaned out on another pass. Travelling around a curved track segment may cause the mover 100 some jitter as the mover 100 temporarily contacts a side segment 11 or a top segment 13 of a rail 14. The location within a curved track segment that the mover 100 makes contact during a curve may vary on successive runs. Extra friction, curves, or still other variables in motion may cause the mover 100 to travel at an inconsistent speed along a track segment 12 during different passes by a position feedback sensor 145. Using time-based sampling, the waveforms 225 generated by the position feedback sensor may similarly illustrate these jitters.

Figure 22:
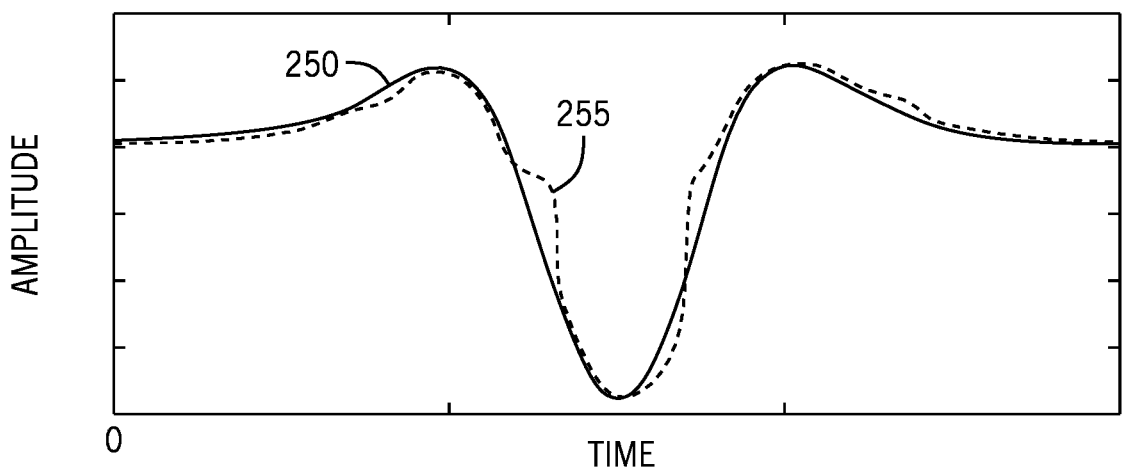
FIG. 22 is a graphical representation of a first position feedback waveform for a mover travelling at a uniform speed and sampled at discrete time intervals and a second position feedback waveform for a mover travelling at a non-uniform speed and sampled at the same discrete time intervals.

With reference to FIG. 22, an example of the jitter that may be introduced due to time-based sampling is illustrated. A first waveform 250 for position feedback is illustrated when the mover 100 is travelling at a constant speed. Because the mover 100 is travelling at a constant speed, the position interval traversed by the mover 100 between samples is constant and the resulting waveform corresponds to the exemplary waveform illustrated in FIG. 15. A second waveform 255 is also shown during which non-ideal conditions such as friction, travelling along a curve, or any other interference between the mover 100 and the track segment 12 cause some variation in the speed at which a mover 100 travels. An increase in friction or rubbing along the rail 14 may temporarily slow the mover 100 such that the position does not track the constant speed waveform 250. The segment controller 50 will compensate for motion error and return the mover 100 to the desired position. In some instances, some overshoot may occur and the mover 100 may be slightly ahead of the desired position illustrated by the constant speed waveform 250. Such variations in speed create variations in the shape of the waveform generated by each position feedback sensor 145 and could be interpreted as variations in the magnetic field generated by the magnets 130 on the mover 100.

To minimize the effects of motion jitter on the feedback waveforms, the segment controller is configured to convert the time-based samples to position-based sample via interpolation. If, for example, a speed at which the mover 100 is travelling over a time interval is recorded along with the value of the sampled position feedback waveform, the segment controller 50 can use two successive values of the position feedback waveform along with the corresponding speed at which the mover 100 travelled during the time interval between samples and determine an approximate value of the sampled position feedback waveform at a specific position. The segment controller 50 may then determine values for the position feedback waveform at discrete position intervals rather than at discrete time intervals, resulting in a position-based waveform. Interpolating the second time-based waveform 255 in FIG. 22 to a position-based waveform will result in a waveform approximately equal to the first time-based waveform 250 during which the mover 100 was travelling at a uniform speed. The position-based waveform eliminates, or at least minimizes, jitter introduced from the time-based sampling.

After normalizing the waveform 225, a digital fingerprint for the waveform is determined. With reference still to FIG. 15, the segment controller 50 stores a number of sampled values 235 for the waveform 225. According to one aspect of the invention, the sampled values 235 are taken near the peak values in each segment 226, 228, 230. Sampling the waveform 225 near the peak value in each segment provides for a greater signal-to-noise ratio in the measured waveform and better identifies variations in the magnetic field being represented by the measured waveform. The number of samples taken at each peak may vary. The number of samples may depend, for example, on the magnitude of the peak, the duration for which the waveform remains near the peak value, the sampling frequency, and the like. As the number of samples of the waveform 225 increases, the samples are necessarily extending downward along the curve nearer toward zero. Thus, the signal-to-noise ratio decreases at these samples and the likelihood of electrical noise causing variation in the measured waveform rather than differences in the magnetic field being measured causing variation in the measured waveform increases. According to another aspect of the invention, the number of samples taken at a peak value is less than two hundred. For the illustrated embodiment, the number of samples of the first and third peak values may be in a range between about fifty and one hundred, while the number of samples of the second peak value may be in a range between one hundred and one hundred fifty. The number of sampled values is sufficient to identify variations in the measured magnetic fields between different movers 100 while being immune to influences of electrical noise in the measured values.

The sampled values 235 are used to generate a digital fingerprint 59 (see also FIG. 13) for each mover 100. The digital fingerprint 59 is generated as a function of at least one sampled value 235 of the waveform 225 from each segment 226, 228, 230. The digital fingerprint may be an array of values, including the sample value 235 having the greatest amplitude in each segment. Optionally, a number of sampled values 235, such as two, three, or more may be stored for each segment. According to still another option, a number of sampled values 235 in each segment 226, 228, 230 are added together, and the resultant sum for each segment 226, 228, 230 is used to create the digital fingerprint. Normalization of position feedback sensors 145 means each position feedback sensor 145 should generate the same measured waveform 225 for a single mover 100 as the mover passes each of the position feedback sensors 145. As a result, the waveform 225 from each position feedback sensor will generate the same digital fingerprint 59. Variations in the magnetic fields generated by the array of magnets 130 present on each mover 100 will, however, cause the measured waveforms 225 to vary for different movers 100. These variations in the measured waveforms 225, in turn, cause the digital fingerprint 59 for each mover 100 to be different. The digital fingerprints 59 may then be used to uniquely identify each mover 100 in the independent cart system.

In order to identify each mover 100, a correspondence between the digital fingerprint 59 and an identifier for the mover is required. With reference again to FIG. 13, a first embodiment of the invention includes a lookup table 55 in each segment controller 50. The lookup table 55 contains a column of identifiers 57 and a column of digital fingerprints 59. Each identifier 57 is unique and corresponds to one of the movers 100 in the independent cart system. Each identifier 57 also has a unique digital fingerprint 59 associated with the identifier. The digital fingerprint 59 corresponds to the magnetic field generated by the array of magnets 130 present on the mover 100 and the resultant waveform 225 generated by each position sensor 145 as the mover 100 travels past the sensor. Thus, when the segment controller 50 determines a run-time digital fingerprint from a waveform 225 generated by one of the position sensors 145, the segment controller 50 can compare the run-time digital fingerprint to the digital fingerprints 59 stored in the lookup table 55. When the segment controller 50 identifies a stored digital fingerprint 59 matching the run-time digital fingerprint, the segment controller reads the stored identifier 57 corresponding to the stored digital fingerprint 59 to determine the identity of the mover 100 which generated the waveform 225 and the corresponding run-time digital fingerprint 59.

According to another embodiment of the invention, artificial intelligence (AI) may be utilized to determine the identifier 57 for each mover 100. A neural network is trained with a set of digital fingerprints 59 and the associated identifier 57 for each digital fingerprint. After training the neural network, run-time digital fingerprints 59 are provided to the AI, and the AI returns the corresponding identifier 57 for the mover 100.

The discussion of the measured waveforms (FIGS. 15, 20, 21) above, focus on measurement of the magnetic field in a single axis. In particular, the strength of the magnetic field in the y-axis (see FIG. 11), extending toward the track 10, is represented by the illustrated waveforms as a mover passes by a position sensor 145. According to another aspect of the invention, the position feedback sensors 145 are multi-axis sensors. Each position sensor 145 may detect a strength of the magnetic field generated by the magnets 130 in at least two axes and, preferably in the x-axis, y-axis, and z-axis, where the axes are illustrated with respect to an array of magnets 130 in FIG. 11. The signals in each axis may be sampled in a manner discussed above with respect to a single axis. The digital fingerprint may be determined as a function of the sampled values in two or in all three axes.

Variations in the manufacturing tolerances, materials, magnetic fields, and the like for each array of magnets 130 present on a mover 100 will create a unique magnetic field for the mover 100 even when the arrays of magnets 130 have nominally identical construction. In some independent cart systems, however, the number of movers is large enough that the potential exists for the magnetic field of a first mover 100 being similar enough to the magnetic field of a second mover 100 such that the segment controller 50 generates the same digital fingerprint for each mover and is unable to uniquely identify each mover. Therefore, it may be desirable to manufacture the arrays of magnets 130 such that variation in the magnetic fields generated by each array is ensured. The arrays of magnets 130 present on each mover 100 may be constructed such that there are differences in the magnetic fields generated by each mover 100. It is desirable that the differences in the magnetic fields do not impact performance of the linear drive system yet have sufficient variation to ensure each mover 100 is uniquely identified.

Figure 16:
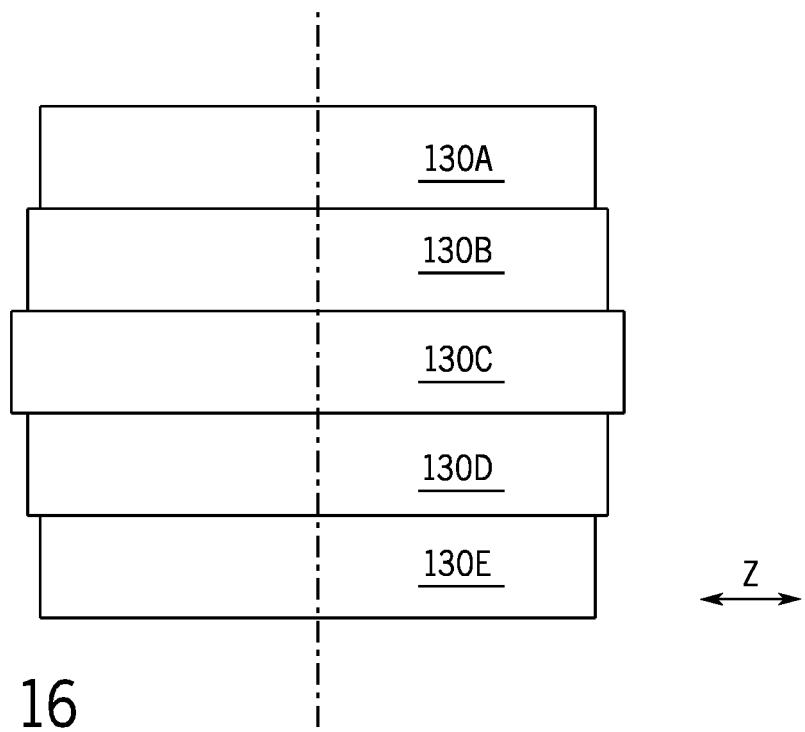
FIG. 16 is a top plan view of an exemplary magnet array having varying length magnets aligned at the center of each magnet.
Figure 17:
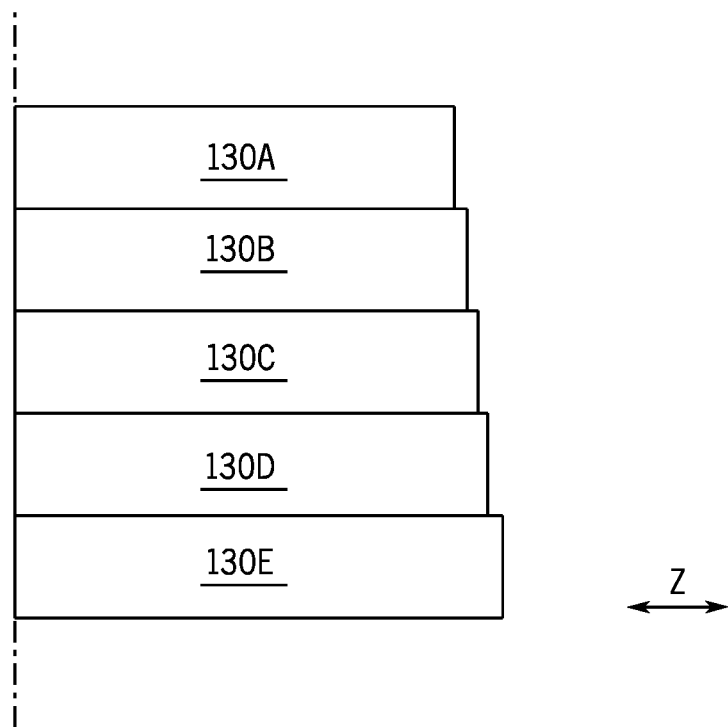
FIG. 17 is a top plan view of an exemplary magnet array having varying length magnets aligned at one edge of each magnet.

According to still another aspect of the invention, at least one dimension of the magnets 130 is varied between one or more of the magnets mounted on a mover 100 to vary the magnetic field generated by the array of magnets. Referring to FIGS. 16 and 17, two examples of magnets 130 with different lengths are illustrated. According to the illustrated embodiments, the length 132 of each magnet 130 extends in the z-axis, which is orthogonal to the direction of travel for the mover 100 and is orthogonal to a surface of the track 10 on which the mover travels. In FIG. 16, a first magnet 130A and a fifth magnet 130E have a first length. A second magnet 130B and a fourth magnet 130D have a second length, and a third magnet 130C has a third length. Each of the magnets 130A-130E are positioned on the mover such that the center point of each magnet 130 is aligned. In FIG. 17, a first magnet 130A has a first length. A second magnet 130B has a second length. A third magnet 130C has a third length. A fourth magnet 130D has a fourth length, and a fifth magnet 130E has a fifth length. Each of the magnets 130A-130E are positioned on the mover such that one end of each magnet 130 is aligned. Variation in length is preferably small to minimize overall impact on the magnetic field generated by the magnets 130, where the magnetic field is one half of the linear drive system for each mover 100. Incremental changes in length between magnets 130 may be less than one millimeter and, in one example, are one half of one millimeter (0.5 mm). An overall difference in length between a shortest magnet and a longest magnet in an array of magnets 130 may be less than ten millimeters and, in one example, is four millimeters (4 mm) or less. Utilizing magnets 130 with lengths that vary by one half of one millimeter between an initial length (0 mm variation) and up to four millimeters (4 mm) in variation yield nine different potential lengths of magnets 130. Varying different combinations of one or more magnets 130 selected from the five-magnet array illustrated results in thousands of combinations of different magnet configurations, where each combination generates a unique magnetic field. Thus, intentional variations in magnet configuration can ensure sufficient variation between magnetic fields to yield unique identification of each mover 100 in an independent cart system.

Figure 20:
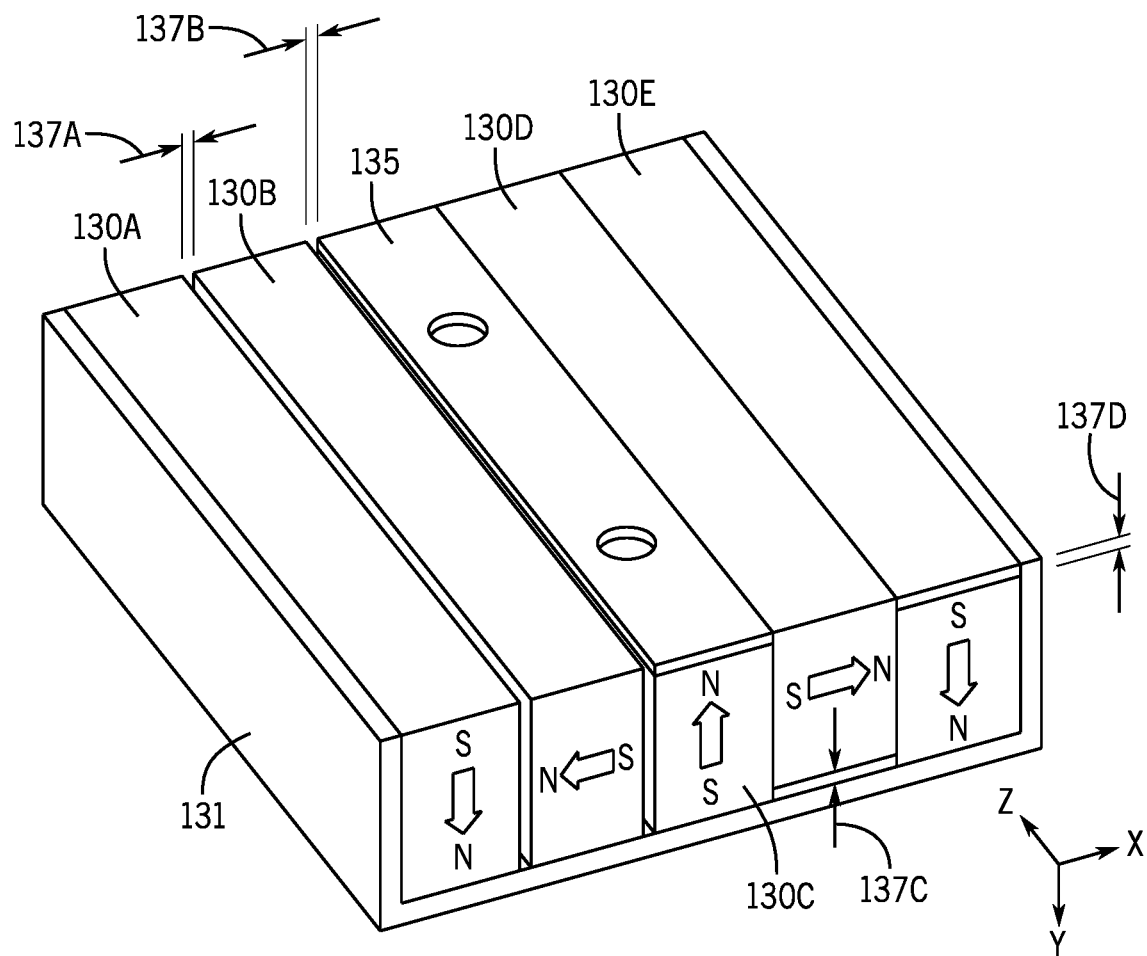
FIG. 20 is a perspective view of an exemplary magnet array having gaps within the magnet array.

Referring next to FIG. 20, magnets 130 with varying heights are also illustrated. The height of each magnet extends in the y-axis, which extends away from the surface of the track 10 on which the mover 100 travels. The first magnet 130A and the second magnet 130B each have a first height, extending for the entire height of the array of magnets. The third magnet 130C has a second height, which is less than the first height by the width of a plate 135 mounted along the center magnet. Each of the fourth magnet 130D and the fifth magnet 130E similarly have a height different than the first height. A gap 137C is present between the bottom of the fourth magnet 130D and the housing 131 in which the array of magnets is mounted. Similarly, a gap 137D is present from the top of the fifth magnet 130E to the height of the housing 131 for the array of magnets. The gaps 137C, 137D may be filled with a material such as a potting material or with another plate similar to the mounting plate 135 over the center magnet. Optionally, the gaps 137C, 137D may be primarily filled with air, where the magnetic field travelling through air affects the overall magnetic field generated by the array of magnets.

With reference still to FIG. 20, the magnets 130 may also have varying widths. The width of each magnet extends in the x-axis, which is the direction of travel for the mover 100. The width of the first magnet 130A in FIG. 20 is less than the width of the first magnet 130A shown, for example, in FIG. 11. A gap 137A is present between the first magnet 130A and the second magnet 130B. Similarly, a gap exists between the second magnet 130B and the third magnet 130C. The gaps 137A, 137B may be filled with a material such as a potting material or another plate similar to the mounting plate 135 over the center magnet. Optionally, the gaps 137A, 137B may be primarily filled with air, where the magnetic field travelling through air affects the overall magnetic field generated by the array of magnets. For still other combinations of different magnets 130 in the array, variations in the width and/or height of the magnets 130 may be achieved with magnets directly adjacent to each other, eliminating gaps 130A, 130B between magnets. Similarly, gaps 137 between, beneath, or above magnets 130 may be introduced into different arrays having magnets of identical size. The incremental changes in width and/or height between magnets 130 may be less than one millimeter and, in one example, are one half of one millimeter (0.5 mm). An overall difference in width and/or height between magnets in an array of magnets 130 may be less than ten millimeters and, in one example, is four millimeters (4 mm) or less. Similarly, the size of gaps may be incrementally sized with similar dimensions to the variations in the magnet dimensions. The gaps may vary by one half of one millimeter between an initial length (0 mm variation) and up to four millimeters (4 mm). The additional degrees of freedom in varying dimensions between heights and widths of the magnets 130 as well as introducing and varying the widths of gaps between magnets 130 yields thousands of additional combinations for the construction of magnet arrays.

In addition to varying a dimension of the magnet 130, materials from which the array of magnets 130 is constructed may be varied. With reference to FIG. 11, a plate 135 is mounted along an upper surface of the center magnet 130. The plate is a magnetic receptive structure, through which the magnetic field generated by the magnets 130 may pass. The plate includes threaded holes configured to receive a bolt or screw to secure the array of magnets 130 within the lower portion 104 of the body 102 of each mover 100. Optionally, the plate may have varying dimensions. For example, the plate 135 may extend over the entire top surface of the magnets 130. Optionally, the plate may be extended over a portion of the magnets 130 or be rotated, for example ninety degrees to the illustrated embodiment. Still other magnetic receptive structures may be mounted to the array of magnets 130, where the magnetic receptive structure has magnetic properties different than free air and which influence the direction of the magnetic flux generated by the magnets 130. The plate may be made of electrical steel, which is used in electrical machinery where high magnetic permeability is desired, where electrical steel has a magnetic permeability in the range of four thousand microhenries per meter of thickness (4000 µH/m). Alternate materials, such as stainless steel, cast iron, or low carbon steel may be used where the materials have a range of magnetic permeability from a high of about two thousand to a low of about sixty microhenries per meter of thickness (60-2000 µH/m).

In addition to the plate 135 in the center of the array, the magnets themselves may be made of different materials. The strength of the magnetic field is a function, at least in part, of magnetic remanence and magnetic coercivity of the materials from which the magnets 130 are made. Permanent magnets may be constructed of materials such as Neodymium (NdFeB), Samarium Cobalt (SmCo), Alnico (AlNiCo), ferrite, and the like. The magnetic remanence of these magnets may vary from about thirty-five hundredths to one and four tenths of a Tesla (0.35-1.4 T). The magnetic coercivity may vary from about one hundred to about three thousand two hundred kiloamperes per meter (100-3200 kA/m). Varying materials from which the magnets 130 are made, in combination with varying dimensions of a magnet, as discussed above, further increase the potential different combinations of arrays of magnets 130 present on each mover 100 in the independent cart system, where each combination generates a unique magnetic field.

Figure 18:
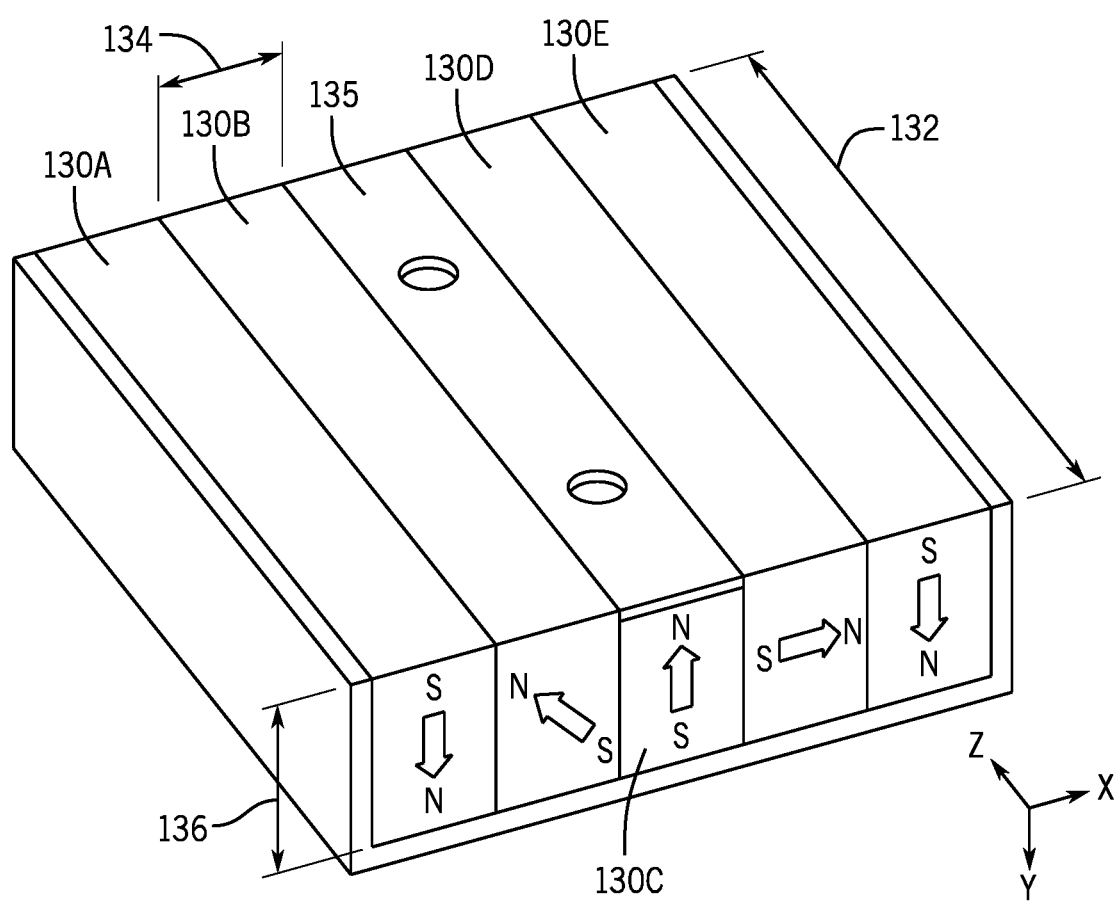
FIG. 18 is a perspective view of an exemplary magnet array having one magnet with a skewed magnetic field.
Figure 19:
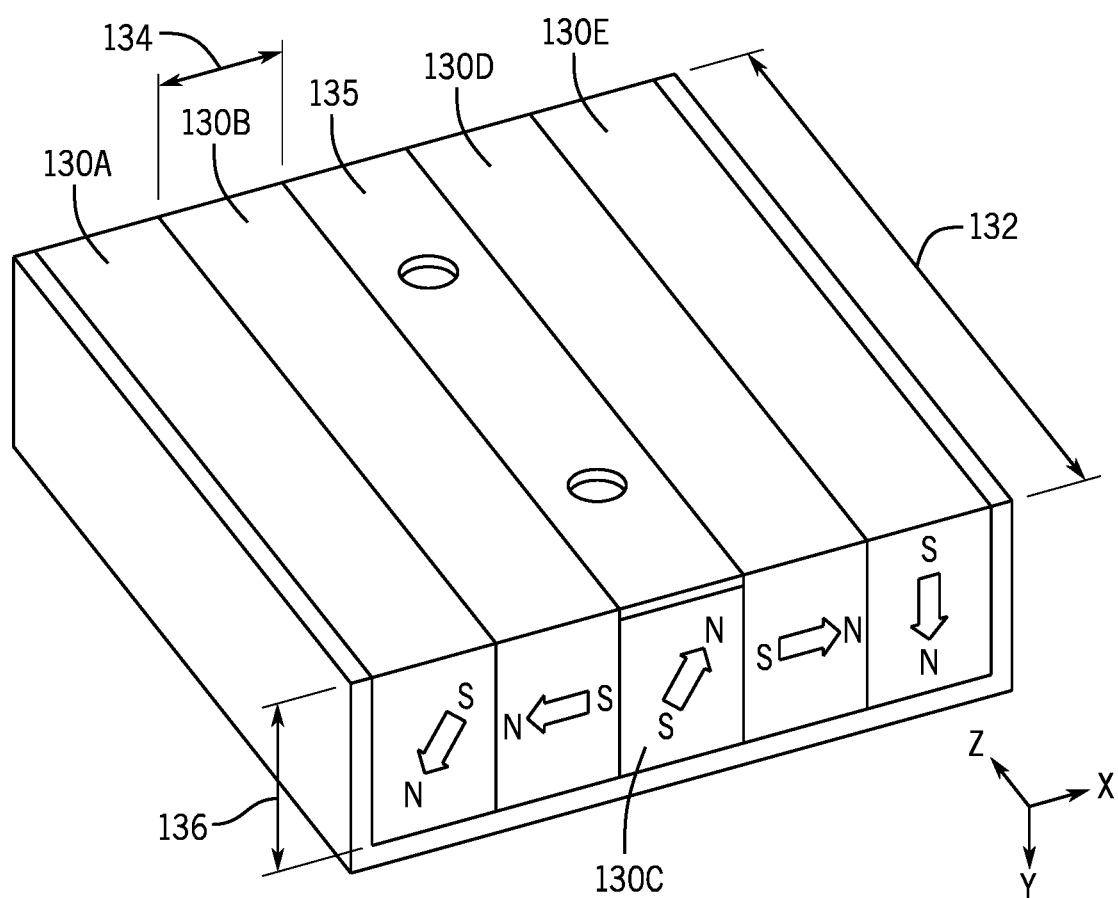
FIG. 19 is a perspective view of an exemplary magnet array having two magnets with skewed magnetic fields.

According to still another aspect of the invention, the magnetic field generated by the array of magnets 130 may be varied by changing the orientation of the magnetic field within one or more of the magnets 130 in the array. Turning to FIGS. 18 and 19, two examples of magnet arrays in which the magnets 130 have magnetic fields in varying orientations are shown. When compared to the magnet array illustrated in FIG. 11, the magnet array in FIG. 18 includes a single magnet 130 in which the orientation of the poles is varied. The second magnet 130B has been polarized differently or mounted within the array in an orientation other than parallel to the lower surface of the array. The orientation of the magnetic field on the second magnet 130B is illustrated by the arrow extending from the south pole to the north pole. In the embodiment shown in FIG. 18, the magnetic field for the second magnet 130B has been rotated upward from the embodiment illustrated in FIG. 11. Similarly, the magnet array in FIG. 19 has two magnets 130 in which the orientation of the poles is varied from the magnet array of FIG. 11. The first magnet 130A and the third magnet 130C each have a magnet field rotated such that the orientation is no longer perpendicular to the lower surface of the array. Incremental changes in the orientation of the magnetic field may include rotation by about five degrees. An overall difference in the rotation between magnets on different arrays may be less than forty-five degrees and, in one example, is less than thirty degrees. Variations in the orientation of the magnetic fields in at least one magnet 130 on a mover 100 yield still another option for generating a unique magnetic field with each mover 100 in an independent cart system.

According to yet another aspect of the invention, an initial measurement of the magnetic field generated by the array of magnets 130 may be performed in a factory. A calibration fixture may include a section of track and a sensor 145 past which a mover 100 travels. As the mover 100 travels past the test sensor, the waveform generated by the sensor 145 is utilized to generate a digital fingerprint of the magnetic field produced by the magnets 130 on the mover. This digital fingerprint is recorded along with an identifier, such as a serial number for the mover, and provided to a customer. In addition, the sensor 145 used in the calibration fixture may be include its own offset and gain values. However, the sensor 145 in the calibration fixture may be a single sensor and may not be calibrated to a specific nominal value. Rather, the waveform generated by the sensor 145 may define the nominal value of the waveform to which other sensors 145 are normalized. The offset and gain values for the sensor 145 used to generate the digital fingerprint may be included in data provided to a customer. These offset and gain values may be used as a basis for calibrating each of the sensors 145 in an independent cart system at a customer's facility. A difference between the gain and offset values for each sensor 145 at the customer's facility and the gain and offset values for the factory sensor may generate the gains and offset values used to normalize the waveform for generation of run-time digital fingerprints. Optionally, a predefined nominal waveform may be defined for all sensors 145, whether used in the factory or in a customer's facility. The offset and gain value for the factory sensor 145 may normalize the waveform for the digital fingerprint generated in the factory to the predefined nominal waveform. Offset and gain values for each sensor 145 in the customer's facility may similarly normalize waveforms generated by each sensor 145 to the predefined nominal waveform.

Each independent cart system is provided with a set of movers 100 for which each mover 100 may be uniquely identified as a function of the magnetic field generated by the magnets 130 present on the mover 100. Each mover 100 is passed through the calibration fixture at the factory to generate a digital fingerprint for the mover 100. If the magnetic fields for two movers 100 are too similar to each other because variations in manufacturing tolerances have not provided sufficient differentiation between the two movers 100, a second mover 100 having the same digital fingerprint as a first mover is rejected for a particular independent cart system. As the number of movers 100 increase for a particular independent cart system, the potential for duplicate digital fingerprints increases. Thus, it may be desirable to utilize one of the methods discussed above for intentionally varying the manufacture of the magnets 130 and/or materials of the movers 100 to provide for movers 100 generating unique digital fingerprints. A table including of all the movers 100 in an independent cart system is provided to the customer, where the table includes the unique identifier and the digital fingerprint of each mover. This table is stored as the lookup table against which run-time digital fingerprints are compared or used to train the AI engine present to identify each mover.

Figure 23:
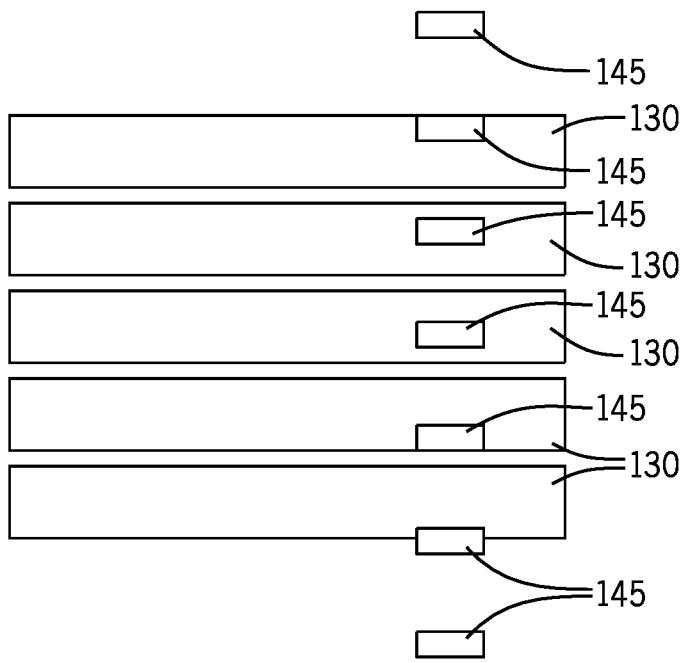
FIG. 23 is a top plan view of an exemplary magnet array with position sensors aligned off-center with respect to the magnet array.

In addition to varying physical properties of the magnets 130 to create variations in the magnetic fields generated by the magnets 130 it may be desirable to vary the location of the sensors 145 used to detect the magnetic fields. With reference to FIG. 10, sensors 145 may be located in a central position beneath the magnets 130. However, with reference also to FIG. 23, it may be desirable to locate the sensors 145 in a position that is shifted toward one side of the array of magnets 130. Depending on the variation in the physical construction of the magnets 130 between different movers, the variation in the magnetic field generated by each array of magnets may be more significant along one edge of the magnet array. Varying the length 132 of each magnet, as shown in FIGS. 16 and 17 can create greater variation in the strength of the magnetic field along one edge of the magnet array. The amplitude of the feedback signal 225 will have greater variation and, therefore, greater variation in the digital fingerprints generated. The increased variation reduces the potential for misidentification of a mover 100.

Figure 24:
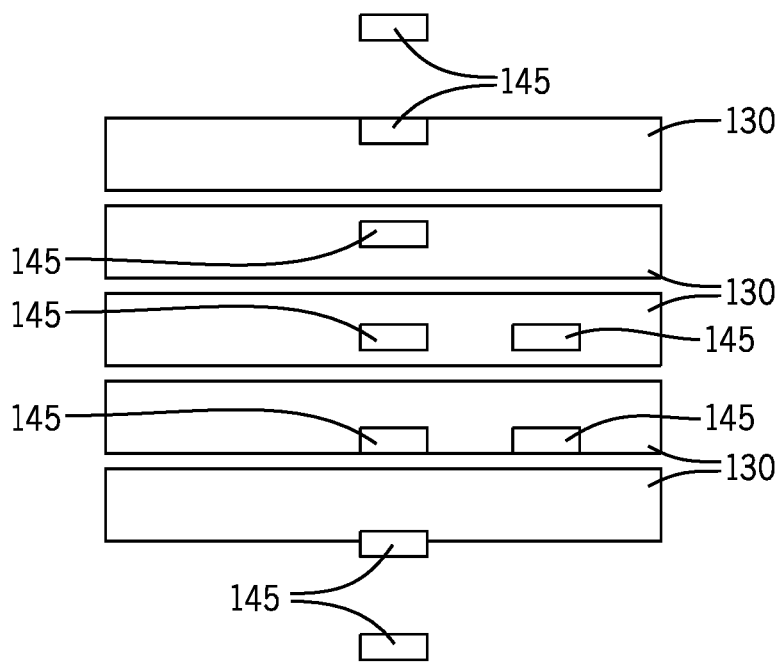
FIG. 24 is a top plan view of an exemplary magnet array with position sensors aligned to the center of the magnet array and dedicated identification sensors aligned off-center with respect to the magnet array.

With reference also to FIG. 24, a first set of position sensors 145 may be centrally located beneath the magnets 130. A second sensor 145, or second set of sensors, may be located at a single location, or spaced apart at multiple stations, and be positioned off-center along the track 10. The first set of position sensors 145 may be located in a position with a strong and more consistent magnetic field. A central location may be preferred to obtain position feedback information for the location of each mover 100 and is used to regulate current in the coils 150 for the linear drive system. While there is still variation in the magnetic fields generated at the central alignment and that variation is used to determine an initial identification of each mover 100, the second set of sensors 145 may be located in a region of high variation of the magnetic field. The increased variation in the magnetic field, allows for increased variation in the digital fingerprints determined for each mover 100 and improves reliability of the identification of each mover 100. These second sets of sensors may perform a verification check on the identity of each mover 100 as it passes the location with the off-center sensors 145.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. An independent cart system, comprising:
a plurality of track segments, each track segment of the plurality of track segments further comprising:
a plurality of coils along a length of the track segment, and
a segment controller operative to selectively energize the plurality of coils to generate an electromagnetic field with each of the plurality of coils;
a plurality of movers, each mover of the plurality of movers including a magnet array having a plurality of magnets, wherein the magnet array generates a magnetic field that interacts with the electromagnetic field generated by the plurality of coils to propel the mover along each of the plurality of track segments;
a plurality of position sensors spaced apart along the length of each track segment, each position sensor from the plurality of position sensors generates a position feedback signal with a waveform which is a function of the magnetic field generated by the magnet array on each mover; and
a controller operative to:
receive the position feedback signal from each position sensor, and
determine a unique identifier for each of the plurality of movers as a function of the waveform of the position feedback signal.

2. The independent cart system of claim 1, wherein each magnet from the plurality of magnets in the magnet array for each mover has a length, extending orthogonal to a direction of travel for each mover and parallel to a surface of each track segment; a width, extending in the direction of travel; and a height, extending orthogonal to the direction of travel and orthogonal to the surface of each track segment.

3. The independent cart system of claim 2, further comprising:
a first mover, selected from the plurality of movers, including a first magnet array with a first plurality of magnets; and
a second mover, selected from the plurality of movers, including a second magnet array with a second plurality of magnets, wherein:
each magnet of the first plurality of magnets has a corresponding magnet in the second plurality of magnets, and
at least one magnet from the first plurality of magnets has a different length, width, or height than the corresponding magnet in the second plurality of magnets.

4. The independent cart system of claim 3, wherein:
each magnet of the first plurality of magnets is aligned at a center point of the magnet, and
each magnet of the second plurality of magnets is aligned at one end of the magnet.

5. The independent cart system of claim 2, further comprising:
a first mover, selected from the plurality of movers, including a first magnet array with a first plurality of magnets; and
a second mover, selected from the plurality of movers, including a second magnet array with a second plurality of magnets, wherein:
each magnet of the first plurality of magnets has a corresponding magnet in the second plurality of magnets,
each magnet of the first plurality of magnets is mounted to the first mover at a first position with respect to the first mover,
each magnet of the second plurality of magnets is mounted to the second mover at a second position with respect to the second mover, and
at least one dimension of the second position is offset from a corresponding dimension of the first position.

6. The independent cart system of claim 1, wherein the magnet array for each mover includes a magnetic receptive structure mounted within the magnetic field generated by the magnet array.

7. The independent cart system of claim 6, wherein the magnetic receptive structure is a plate mounted adjacent to at least one of the plurality of magnets in each magnet array.

8. The independent cart system of claim 6, further comprising:
a first mover, selected from the plurality of movers, including:
a first magnet array with a first plurality of magnets, and
a first magnetic receptive structure; and
a second mover, selected from the plurality of movers, including:
a second magnet array with a second plurality of magnets, and
a second magnetic receptive structure, wherein either a magnetic remanence or a magnetic coercivity for the first magnetic receptive structure is different than a magnetic remanence or a magnetic coercivity for the second magnetic receptive structure.

9. The independent cart system of claim 1 further comprising:
a first mover, selected from the plurality of movers, including a first magnet array with a first plurality of magnets; and
a second mover, selected from the plurality of movers, including a second magnet array with a second plurality of magnets, wherein:
each magnet of the first plurality of magnets has a corresponding magnet in the second plurality of magnets,
each magnet of the first plurality of magnets has a field orientation for a magnetic field generated in the magnet,
each magnet of the second plurality of magnets has a field orientation for a magnetic field generated by the magnet, and
the field orientation for at least one magnet in the first plurality of magnets is different than the field orientation for the corresponding magnet in the second plurality of magnets.

10. The independent cart system of claim 1, wherein the position feedback signal generated by each of the plurality of position sensors is normalized such that the position feedback signal generated from each of the plurality of position sensors is the same for the magnetic field generated by the magnet array on each mover.

11. A system of movers for use in an independent cart system, the system comprising:
a first mover, comprising:
a first magnet array, wherein the first magnet array generates a first array magnetic field that interacts with an electromagnetic field generated by a plurality of coils to propel the first mover along a track for the independent cart system, the first magnet array including a plurality of first magnets, wherein:

each first magnet from the plurality of first magnets includes a first length, extending orthogonal to a direction of travel for the first mover and parallel to a surface of the track; a first width, extending in the direction of travel; and a first height, extending orthogonal to the direction of travel and orthogonal to the surface of the track segment, and each first magnet from the plurality of first magnets includes a body of the first magnet and a first magnet magnetic field, wherein the first magnet magnetic field has a first orientation through the body of the first magnet; and a second mover, comprising:
a second magnet array, wherein the second magnet array generates a second array magnetic field that interacts with the electromagnetic field generated by the plurality of coils to propel the second mover along the track for the independent cart system, the second magnet array including a plurality of second magnets, wherein:
each second magnet corresponds to a first magnet in the first magnet array,
each second magnet from the plurality of second magnets includes a second length, extending orthogonal to a direction of travel for the second mover and parallel to the surface of the track; a second width, extending in the direction of travel; and a second height, extending orthogonal to the direction of travel and orthogonal to the surface of the track segment,
each second magnet from the plurality of second magnets includes a body of the second magnet and a second magnet magnetic field, wherein the second magnet magnetic field has a second orientation through the body of the second magnet, and
a physical construction of a first magnet differs from a physical construction of a corresponding second magnet such that the first array magnetic field differs from the second array magnetic field.

12. The system of claim 11, wherein:
the first mover further comprises a first unique identifier corresponding to the first array magnetic field; and
the second mover further comprises a second unique identifier corresponding to the second array magnetic field, wherein a controller receiving a feedback signal corresponding to the first and second array magnetic fields identifies the first and second unique identifiers, respectively.

13. The system of claim 11, wherein at least one of the first length, the first width, or the first height for one of the first magnets is different than the second length, the second width, or the second height of the corresponding second magnet.

14. The system of claim 13, wherein:
each first magnet is aligned at a center point of the first magnet, and
each second magnet is aligned at one end of the second magnet.

15. The system of claim 11, wherein:
each first magnet is mounted to the first mover at a first position with respect to the first mover,
each second magnet is mounted to the second mover at a second position with respect to the second mover, and
at least one dimension of the second position is offset from a corresponding dimension of the first position.

16. The system of claim 11, wherein:
the first mover further comprises a first magnetic receptive structure mounted within the first array magnetic field, and
the second mover further comprises a second magnetic receptive structure mounted within the second array magnetic field.

17. The system of claim 16, wherein the first magnetic receptive structure is a plate mounted adjacent to at least one of the first magnets and the second magnetic receptive structure is a plate mounted adjacent to at least one of the second magnets.

18. The system of claim 16, wherein either a magnetic remanence or a magnetic coercivity for the first magnetic receptive structure is different than a magnetic remanence or a magnetic coercivity for the second magnetic receptive structure.

19. The system of claim 11, wherein:
each first magnet has a field orientation for a magnetic field generated in the first magnet,
each second magnet has a field orientation for a magnetic field generated by the second magnet, and
the field orientation for at least one first magnet is different than the field orientation for the corresponding second magnet.

20. The system of claim 11, further comprising a plurality of position sensors spaced along the track for the independent cart system, wherein each of the plurality of position sensors generates a first waveform corresponding to the first array magnetic field and a second waveform corresponding to the second array magnetic field, wherein the first waveform and the second waveform are normalized such that the first waveforms generated by each of the plurality of position sensors is the same and the second waveform generated by each of the plurality of position sensors is the same.

* * * * *